US005790667A

United States Patent [19]

Omori et al.

[11] Patent Number: 5,790,667
[45] Date of Patent: Aug. 4, 1998

[54] PERSONAL AUTHENTICATION METHOD

[75] Inventors: Motoji Omori, Osaka; Makoto Tatebayashi, Takarazuka; Natsume Matsuzaki, Minoo, all of Japan

[73] Assignee: Matsushita Electric Industrial Co., Ltd., Osaka-fu, Japan

[21] Appl. No.: 589,546

[22] Filed: Jan. 22, 1996

[30] Foreign Application Priority Data

Jan. 20, 1995 [JP] Japan ................................ 7-007689

[51] Int. Cl.$^6$ ...................................................... H04L 9/00
[52] U.S. Cl. ........................... 380/23; 380/49; 380/30
[58] Field of Search ................................ 380/23, 25, 30, 380/49; 235/380, 382; 340/825.34

[56] References Cited

FOREIGN PATENT DOCUMENTS 4-365169 12/1992 Japan ............................. G06F 15/30

OTHER PUBLICATIONS

Ikeno et al., "Discrete Logarithm Problem", Current Cryptography Theory (Genzai Ango Riron): Information Communication Society, 1986, p. 203.
Ikeno et al., Current Cryptography Theory (Genzai Ango Riron): Information Communication Society, 1986, p. 204.
Ikeno et al., "Fermat's Theorem", Current Cryptography Theory (Genzai Ango Riron): Information Communication Soceity, 1986, p. 242.
Ikeno et al., Current Cryptography Theory (Genzai Ango Riron): Information Communication Society, 1986, pp. 17–18.
Okamoto, "One-way Hash Function", Introduction to Theory of Cryptography (Ango Riron Nyumon): Kyoritsu Shuppan, 1993, p. 138.

International Standard ISO/IEC 9788–4: 1995, Information technology—Security techniques—Entity authentication—Part 4: Mechanisms using a cryptographic check function.

*Primary Examiner*—Thomas H. Tarcza
*Assistant Examiner*—Pinchus M. Laufer
*Attorney, Agent, or Firm*—Wenderoth, Lind & Ponack, L.L.P.

[57] ABSTRACT

A user i calculates authentication application information involving a random-number parameter and transmits it to a sales company A. At the sales company A, the received authentication application information is one-way transformed using a random-number parameter and is transmitted to the user i as authentication challenged information. At the user i, an identification number for credit membership of the user and a password are inputted and the received authentication challenge information is transformed using the password to create authentication response information. Then the identification number of the user i and the authentication response information are transmitted to the sales company A. At the sales company A, the received authentication response information is one-way transformed so that the random-number parameter is cancelled so as to produce authentication reference information. Then the received identification number and the authentication reference information are transmitted to the credit company b. At the credit company b, transformed secret information which is stored in advance is retrieved using the received identification number as a key and it is determined whether the transformed secret information and the authentication reference information are equal. If they are equal, the credit company b transmits to the sales company A authentication information indicating correctness of the user i, and if they are not equal, it transmits authentication information indicating that the user i can not be authenticated as a correct user. At the sales company A, the authentication information transmitted from the credit company b is transmitted to the user i.

63 Claims, 23 Drawing Sheets

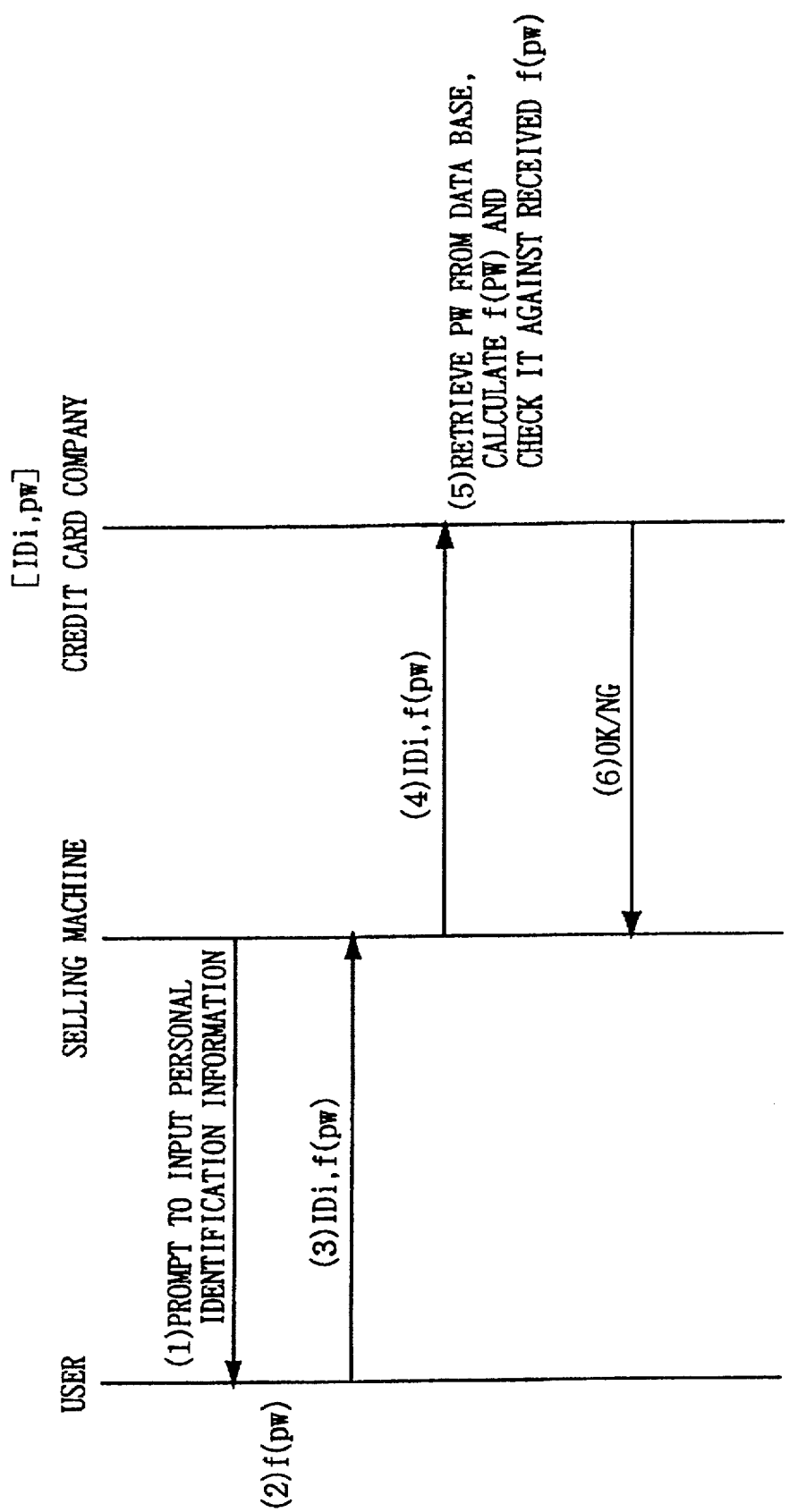

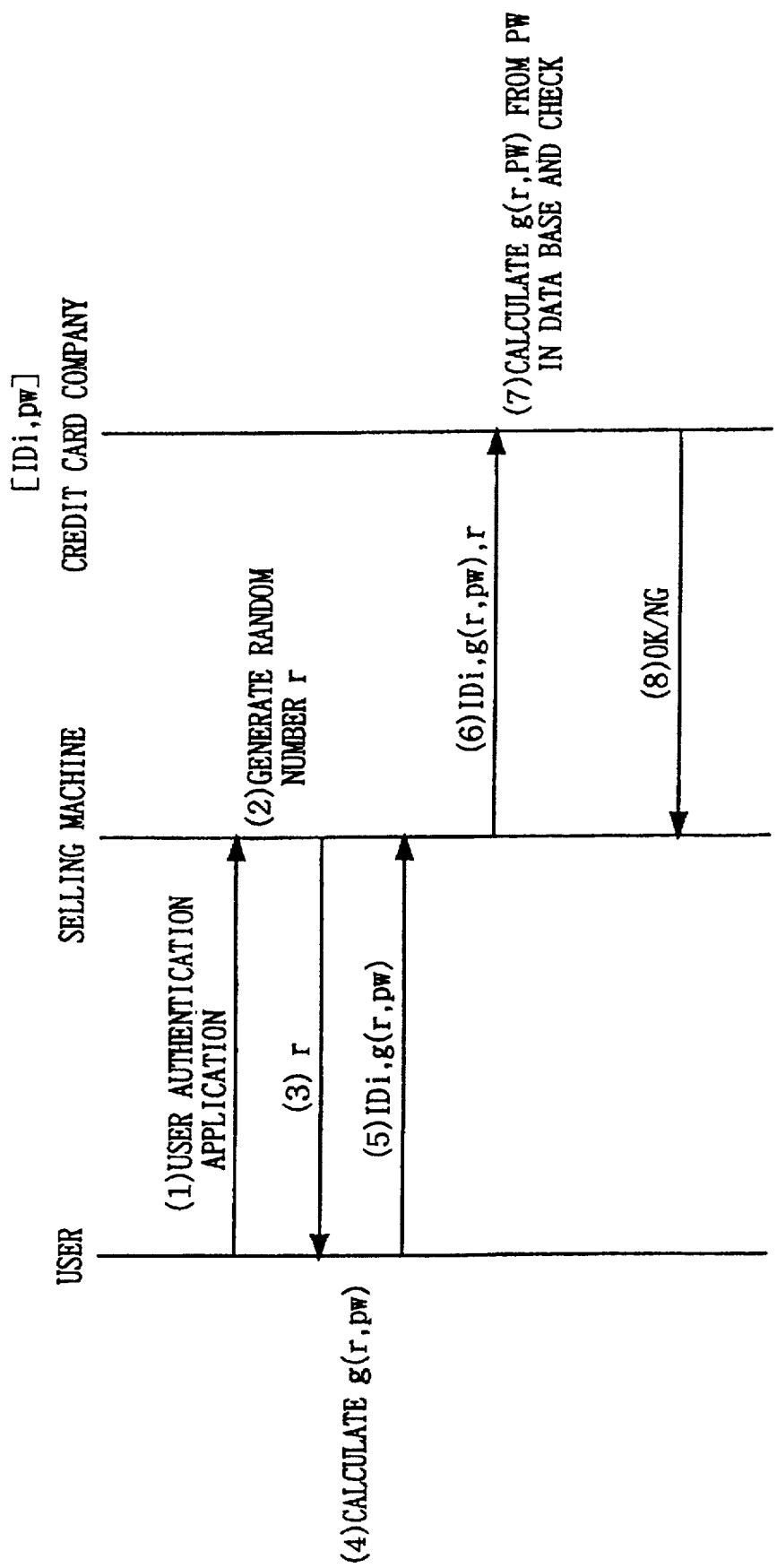

PERSONAL AUTHENTICATION METHOD

BACKGROUND OF THE INVENTION

1. Field of the Invention

The present invention relates to methods for personal authentication and more particularly to a method in which first and second authenticating stations cooperatively authenticate information, related to a prover, transmitted from a prover station.

2. Description of the Background Art

Recently, accounts for the purchase of goods have been conventionally settled by using a credit card. When settling accounts with a credit card, it is necessary to confirm that a card user is in fact the card owner. This is called personal authentication. Next, the conventional methods for personal authentication will be described to indicate the drawbacks of such methods.

(First Conventional Example)

A user of a credit card signs a purchase slip for personal authentication. The signature is checked against a signature of the card owner written on the back of the card. This check for identification of the signature is usually made by human. It is very difficult to authenticate a signature using a computer, although it is not impossible. Accordingly, this kind of personal authentication is limited to sales occurring at stores.

(Second Conventional Example)

Recently, payments with credit cards are made not only at stores but also in cases of purchases of a goods at selling machines (such as an automatic vending machines). In this case, since it is technically difficult to perform personal authentication for a user of a card using an owners signature, it is usually performed using a password number. That is to say, as shown in FIG. 23, a user operates a selling machine for the purchase of goods. This selling machine is connected to a credit card company through a communication line. When the user inserts a credit card into a card reader of the selling machine to pay with the credit card, the card reader reads information such as an identification number of the credit card, a name of the user, etc. Then, the selling machine prompts the user to input a card number IDi and a card password number registered to that credit card to confirm whether the user of the card is in fact the owner of that card. When the user responds by inputting the password number, that password number is transmitted to the credit company through the communication line. The credit card company refers to a data base using the card number as a key to fetch information about that credit card. It then compares a password number, which the user set when registering as a credit member, with the password currently transmitted from the user. As a result of the comparison, the credit card company transmits information to the selling machine which indicates that the card user is an owner of the card if the passwords match, or information which indicates that the card user is not a card owner if they do not match. Upon receiving the information, the selling machine determines whether to proceed with or stop the selling processing according to the transmitted personal authentication information.

It is necessary for performing personal authentication with a card password number so as to keep the card password number unknown to anyone except the credit card company and the card owner. In the case of the sales system described above, the system must be run under sufficient control, and for example, the selling machine must be installed in an area which is physically protected. It is also necessary to prevent interception of the card password number during the input operation to the selling machine or along the communication line between the selling machine and the credit card company. It is necessary to implement a system such that the credit card company decides that the appropriate conditions are satisfied. Hence, application of the above-described system is restricted to very limited sales of goods such as sales with selling machines which are managed by the credit card company itself and sales with selling machines which are managed by a party which the credit card company can trust, such as sales of tickets of commuting trains.

(Third Conventional Example)

Mail-order sales in which an individual person makes an order for goods by way of personal computer communication is rapidly increasing. Credit cards are often used for payment in such mail-order sales using a network. This is due to the fact that payment is easily made by a user directly as compared with payment made by registered mail or bank funds transfer, due to the fact that a guarantee of payment can be obtained upon receipt of an order by the sales company. When a credit card is used for payment in the mail-order sales, only a membership number is conventionally presented. However, it is quite possible for third parties to obtain the card membership number from a receipt or the like. This produces necessity of personal authentication. The personal authentication with a card password number described above is what is most often used. This will now be described.

Typically a user starts a mail-order sales software program in a personal computer at home. The personal computer communi cates with a selling machine of a mail-order sales company through a telephone line, and this selling machine further communicates with a credit card company through a communication line. The user informs the sales company of his card number to make payment with a card. At this time, the selling machine of the sales company prompts the user to input a password number that is registered for that card to make a determination whether user of the card is an owner of the card. The user then inputs a password number which is transmitted to the credit card company through the telephone line. The card company refers to a data base with that card number as a key and fetches information related to that card. The card company then compares the password number, which the user set at the time of registration as a credit card member, with the password number presently transmitted from the mail-order sales company. As a result, if they match, the card company transmits to the selling machine information indicating that the user of the card is an owner of that card, and if they do not match, the card company transmits information indicating that it is not the owner. Upon receiving the information, the selling machine determines whether to proceed with or stop the selling processing according to the provided personal authentication information.

The "selling machine" in the second conventional example corresponds to a device formed of "the personal computer of the user", "the telephone line" and "the selling machine of the mail-order sales company" in the system of the third conventional example described above. Now, regarding the risk that the password of the user may be known to others in this device, the risk may be larger than that of the second conventional example in two aspects. The first aspect relates to the problem of a tapping of the telephone line. It is easy to tap the telephone line connecting ordinary homes and the mail-order sales company. The second aspect relates to the physical security of the selling machine. It has been mentioned that the selling machine must be installed in a physically protected area in the second conventional example. It was also mentioned that it is restricted to cases where an access from those unconcerned, to say nothing of accesses from general users, are strictly controlled, such as vending machines for commuting train tickets. In the third conventional example, the selling machine of the mail-order sales company is usually realized by a computer installed in the sales company. Strict access control of the computer as described above is necessary. It is not supposed that such strict physical access control is effected in practice, however, then the credit card company will have to decide that there is a difficulty in strictly protecting password numbers of users.

(Fourth Conventional Example)

Accordingly, such a personal authentication system as shown in FIG. 24 is proposed. In FIG. 24, a consumer and a credit card company share a card number IDi and a password pw in advance, and they also share a certain function f. The function f has the property of easily computing f(x) from x but of not easily deriving the value of x from the value of f(x). A function having such a property is referred to as a one-way function hereinafter. The f(pw) is referred to as a transformation password in relation to the password pw, hereinafter. When a selling machine of a mail-order sales company prompts a user to input the personal identification information, the user inputs a password pw into a personal computer and the personal computer calculates a transformation password f(pw) from the password pw. The personal computer then transmits the transformation password f(pw) together with a card number IDi to the mail-order sales company. The mail-order sales company transfers the card number IDi and the transformation password f(pw) to a credit card company. Upon receiving them, the credit card company calculates f(PW) for a password PW stored in relation to that card number in the date base and compares it with the transformation password f(pw) transmitted as stated above. If the result is a match, the credit card company authenticates the user as a card owner, and if the result is a mismatch, the credit card company determines that the user is not an owner of that card. It then informs the mail-order sales company of the information.

In the personal authentication system of this fourth conventional example, the password pw is not transmitted on the telephone line, and it is not processed in a selling machine at the mail-order sales company with uncertain or unsecure security, thus providing a higher level of security compared with the above-described third conventional example. The transformation password f(pw) transmitted on the telephone line always has the same value, however, if an intruder who tapped the telephone line transmits the card number IDi and the f(pw) to the mail-order sales company, the information will be determined to be a correct pair in the credit card company, and then the intruder will be regarded as a correct card owner. Then, the intruder can successfully pretend to be a real owner of the card to succeed in an illicit purchase of goods and payment with the card.

(Fifth Conventional Example)

Accordingly, a personal authentication system in which information transmitted on the communication line varies every time it is transmitted is proposed as shown in FIG. 25. In FIG. 25, a user and a credit card company previously share a card number and a corresponding password pw. The credit card company stores pairs of card numbers and corresponding passwords of a large number of users in a data base. Furthermore, a user and the credit card company share a certain 2-input 1-output function g. The function g has a property such that even if that values of $g(x,y)$ and y are known, the value of x can not be derived. When a selling machine at a mail-order sales company generates a random number r and transmits the random number to a user and prompts the user to input information for personal authentication, the user inputs a card number IDi and a password pw into a personal computer and the personal computer calculates a transformation password $g(r,pw)$ from the pw. The personal computer then transmits the card number IDi and the transformation password $g(r,pw)$ to the mail-order sales company. The mail-order sales company transfers the card number IDi, the transformation password $g(r,pw)$ and the random number r to the credit card company. Upon receipt of them, the credit card company calculates $g(r,PW)$ about a password PW stored in relation with that card number in the above-mentioned data base and compares it with the transformation password $g(r,pw)$ transmitted as mentioned above. If they match, it authenticates the user as an owner of the card, and if they mismatch, it determines that the user is not an owner of that card. Then, the credit company sends that information to the mail-order sales company.

In the personal authentication system of the fifth conventional example, however, $g(r,PW)$ must be calculated at the credit card company. This is a problem because a great burden in information processing is put on the credit card company as compared with the personal authentication system with a physically protected selling machine, shown in the second conventional example, in which the credit card company is in charge of only information processing of referring to the data base. The system also has a disadvantage in that it causes a great change on the on-line system of the credit card company.

SUMMARY OF THE INVENTION

Accordingly, an object of the present invention is to provide a personal authentication method capable of performing authentication at a high security level while reducing the burdens and modifications of a first authenticating station, such as, for example, a credit company.

A first embodiment of the present invention is directed to a method in which first and second authenticating stations cooperatively authenticate information related to a prover transmitted from a prover station, wherein the first authenticating station stores, in a data base, a pair of identification information of the prover and transmitted secret information which is obtained by applying a first one-way transformation to secret information corresponding to the identification information. When the prover requests authentication, the prover station generates a first variable parameter and applies a second one-way transformation to the first variable parameter to generate authentication application information dependent on the first variable parameter and transmits the information to the second authenticating station. The second authenticating station, upon receiving the authentication application information, generates a second variable parameter and applies a third one-way transformation to the second variable parameter and the received authentication application information to generate authentication challenge information dependent on the first and second variable parameters and transmits the information to the prover station. The prover station applies a fourth one-way transformation to the received authentication challenge information, the first variable parameter and the secret information unique to the prover to be authenticated to generate authentication response information independent of the first variable parameter and transmits the information to the second authenticating station with the identification information of the prover.

The second authenticating station applies a fifth one-way transformation to the received authentication response information and the second variable parameter to generate authentication reference information independent of the second variable parameter and transmits the information to the first authenticating station with the received identification information of the prover. Then, the first authenticating station retrieves the transformed secret information corresponding to the received identification information from the data base, checks if the retrieved transformed secret information match with the received authentication reference information, and transmits to the second authenticating station, approval information indicating that the prover is a correct prover when they match, and transmits disapproval information indicating that the prover is not authenticated as a correct prover when they do not match, and the second authenticating station authenticates the prover according to the received approval or disapproval information.

A second embodiment of the present invention is directed to a method in which first and second authenticating stations cooperatively authenticate information related to a prover transmitted from a prover station, wherein the first authentication station stores, in a data base, a pair of identification information of the prover and transformed secret information which is a result of applying a first one-way transformation to secret information corresponding to the identification information. When the prover station makes an authentication application, the second authenticating station generates a first variable parameter and applies a second one-way transformation to the first variable parameter to generate authentication challenge information dependent on the first variable parameter and transmits the information to the prover station. Upon receiving the authentication challenge information, the prover station generates a second variable parameter and applies a third one-way transformation to the second variable parameter, the authentication challenge information and the secret information unique to the prover to be authenticated, to generate first authentication response information dependent on the secret information and the first and second variable parameters, and second authentication response information dependent on the second variable parameter and transmits the information to the second authenticating station with the identification information of the prover.

The second authenticating station applies a fourth one-way transformation to the first variable parameter and the received first and second authentication response information to generate authentication reference information independent of the first and second variable parameters and transmits the information to the first authenticating station together with the received identification information of the prover. The first authenticating station retrieves the transformed secret information corresponding to the received identification information of the prover from the data base, checks if the retrieved transformed secret information match with the received authentication reference information, and when they match, transmit, to the second authenticating station, approval information indicating that the prover is a correct prover, and when they do not match, transmits disapproval information indicating that the prover is not a correct prover, and the second authenticating station authenticates the prover according to the received approval or disapproval information.

The third embodiment of the present invention is directed to a method in which the first and second authenticating stations cooperatively authenticate information related to a prover transmitted from a prover station, wherein the first authenticating station stores, in a data base, a pair of identification information of the prover and transformed secret information which is a result of applying a first one-way transformation to secret information corresponding to the identification information. When the prover station makes an authentication application, the second authenticating station generates a variable parameter and applies a second one-way transformation to the variable parameter to generate authentication challenge information dependent on the variable parameter and transmits the information to the prover station. The prover station applies a third one-way transformation to the received authentication challenge information and the secret information unique to the prover to be authenticated to generate authentication response information and transmits the information to the second authenticating station with the identification information of the prover.

The second authenticating station applies a fourth one-way transformation to the variable parameter and the received authentication response information to generate authentication reference information independent of the variable parameter and transmits the information to the first authenticating station with the received identification information of the prover. The first authenticating station retrieves the transformed secret information corresponding to the received identification information of the prover from the data base, checks if the retrieved transformed secret information matches with the received authentication reference information and transmits approval information, indicating that the prover is a correct prover, to the second authenticating station when they match, and transmits disapproval information indicating that the prover is not a correct prover when they do not match, and the second authenticating station authenticates the prover according to the received approval or disapproval information.

A fourth embodiment of the present invention is directed to a method in which first and second authenticating stations cooperatively authenticate information related to a prover transmitted from a prover station, wherein the first authenticating station stores, in a data base, a pair of identification information of the prover and transformed secret information which is a result of applying a first one-way transformation to secret information corresponding to the identification information. When the prover desires authentication, the prover station generates a first variable parameter and applies a second one-way transformation to the first variable parameter and public information about the second authenticating station to produce authentication application information dependent on the first variable parameter and the public information and transmits the information to the second authenticating station.

Upon receiving the authentication application information, the second authenticating station applies a third one-way transformation to the authentication application information and secret information unique to itself to generate first common-key information independent of the public information, and generates a second variable parameter and applies a fourth one-way transformation to the second variable parameter and the first common-key information to generate authentication challenge information dependent on the first and second variable parameters and transmits the information to the prover station. The prover station applies a fifth one-way transformation to the received authentication challenge information, the first variable parameter and the secret information unique to the prover to be authenticated to generate authentication response information independent of the first variable parameter, and applies a sixth one-way transformation to the first variable parameter to generate second common-key information, and encrypts the identification information of the prover, using the second common-key information, and transmits the information to the second authenticating station together with the authentication response information.

The second authenticating station decrypts, using the first common-key information, the received identification information of the prover encrypted with the second common-key information and applies a seventh one-way transformation to the received authentication response information and the second variable parameter to generate authentication reference information independent of the second variable parameter and transmits the authentication reference information to the first authenticating station together with the decrypted identification information of the prover. The first authenticating station retrieves the transformed secret information corresponding to the received identification information from the data base, checks if the retrieved transformed secret information matches with the received authentication reference information, and when they match, transmits approval information, indicating that the prover is a correct prover, to the second authenticating station, and when they do not match, transmits disapproval information indicating that the prover is not authenticated as a correct prover, and the second authenticating station authenticates the prover according to the received approval or disapproval information.

A fifth embodiment of the present invention is directed to a method in which first and second authenticating stations cooperatively authenticate information related to a prover transmitted from a prover station, wherein the first authenticating station stores, in a data base, a pair of identification information of the prover and transformed secret information which is a result of applying a first one-way transformation to secret information corresponding to the identification information. When the prover desires authentication, the prover station generates a first variable parameter and applies a second one-way transformation to the first variable parameter and public information about the second authenticating station to produce authentication application information dependent on the first variable parameter and the public information and transmits the information to the second authenticating station.

Upon receiving the authentication application information, the second authenticating station applies a third one-way transformation to the authentication application information and secret information unique to itself to generate first common-key information independent of the public information, and generates a second variable parameter and applies a fourth one-way transformation to the second variable parameter and the first common-key information to generate authentication challenge information dependent on the first and second variable parameters and transmits the information to the prover station. The prover station applies a fifth one-way transformation to the received authentication challenge information, the first variable parameter and the secret information unique to the prover to be authenticated to generate authentication response information independent of the first variable parameter, and applies a sixth one-way transformation to the first variable parameter to generate second common-key information, and encrypts prescribed information, using the second common-key information, and transmits the information to the second authenticating station together with the authentication response information and the identification information of the prover.

The second authenticating station decrypts, using the first common-key information, the received prescribed information encrypted with the second common-key information and applies a seventh one-way transformation to the received authentication response information and the second variable parameter to generate authentication reference information independent of the second variable parameter and transmits the authentication reference information to the first authenticating station together with the received identification information of the prover. The first authenticating station retrieves the transformed secret information corresponding to the received identification information from the data base, checks if the retrieved transformed secret information matches with the received authentication reference information, and when they match, transmits approval information, indicating that the prover is a correct prover, to the second authenticating station, and when they do not match, transmits disapproval information indicating that the prover is not authenticated as a correct prover, and the second authenticating station authenticates the prover according to the received approval or disapproval information.

A sixth embodiment of the present invention is directed to a method in which first and second authenticating stations cooperatively authenticate information related to a prover transmitted from a prover station, wherein from a prover station, the first authenticating station store, in a data base, a pair of identification information of the prover and transformed secret information which is a result of applying a first one-way transformation to secret information corresponding to the identification information. When the prover station makes an authentication application, the second authenticating station generates a first variable parameter and applies a second one-way transformation to the first variable parameter to generate authentication challenge information dependent on the first variable parameter and transmits the information to the prover station.

Upon receiving the authentication challenge information, the prover station generates a second variable parameter and applies a third one-way transformation to the second variable parameter, the authentication challenge information and the secret information unique to the prover to be authenticated to generate first authentication response information dependent on the secret information and the first and second variable parameters, and applies a fourth one-way transformation to the second variable parameter and public information about the second authenticating station to generate second authentication response information dependent on the second variable parameter and the public information, applies a fifth one-way transformation to the second variable parameter to generate first common-key information, and encrypts the identification information of the prover, using the first common-key information, and transmits the information to the second authenticating station together with the first and second authentication response information.

The second authenticating station applies a sixth one-way transformation to the received second authentication response information and secret information unique to itself to generate second common-key information independent of the public information, decrypts using the second common-key information, the received identification information of the prover encrypted with the first common-key information, applies a seventh one-way transformation to the second common-key information, the first variable parameter and the received first authentication response information to generate authentication reference information independent of the first and second variable parameters, and transmits the authentication reference information to the first authenticating station together with the decrypted identification information of the prover. The first authenticating station retrieves the transformed secret information corresponding to the received identification information of the prover from the data base, checks if the retrieved transformed secret information matches with the received authentication reference information and transmits, to the second authenticating station, approval information indicating that the prover is a correct prover when they match, and disapproval information indicating that the prover is not a correct prover when they do not match, and the second authenticating station authenticates the prover according to the received approval or disapproval information.

A seventh embodiment of the present invention is directed to a method in which first and second authenticating stations cooperatively authenticate information related to a prover transmitted from a prover station, wherein the first authenticating station stores, in a data base, a pair of identification information of the prover and transformed secret information which is a result of applying a first one-way transformation to secret information corresponding to the identification information. When the prover station makes an authentication application, the second authenticating station generates a first variable parameter and applies a second one-way transformation to the first variable parameter to generate authentication challenge information dependent on the first variable parameter and transmits the information to the prover station.

Upon receiving the authentication challenge information, the prover station generates a second variable parameter and applies a third one-way transformation to the second variable parameter, the authentication challenge information and the secret information unique to the prover to be authenticated to generate first authentication response information dependent on the secret information and the first and second variable parameters, and applies a fourth one-way transformation to the second variable parameter and public information about the second authenticating station to generate second authentication response information dependent on the second variable parameter and the public information, applies a fifth one-way transformation to the second variable parameter to generate first common-key information, and encrypts prescribed information, using the first common-key information, and transmits the information to the second authenticating station together with the first and second authentication response information and the identification information of the prover.

The second authenticating station applies a sixth one-way transformation to the received second authentication response information and secret information unique to itself to generate second common-key information independent of the public information, decrypts, using the second common-key information, the received prescribed information encrypted, using the first common-key information, applies a seventh one-way transformation to the second common-key information, the first variable parameter and the received first authentication response information to generate authentication reference information independent of the first and second variable parameters, and transmits the authentication reference information to the first authenticating station together with the received identification information of the prover. The first authenticating station retrieves the transformed secret information corresponding to the received identification information of the prover from the data base, checks if the retrieved transformed secret information matches with the received authentication reference information and transmits, to the second authenticating station, approval information indicating that the prover is a correct prover when they match, and disapproval information indicating that the prover is not a correct prover when they do not match, and the second authenticating station authenticates the prover according to the received approval or disapproval information.

As described above, in the first through seventh embodiments of the present invention, the authentication response information including secret information of a prover is sent from the prover station to the second authenticating station. The authentication response information is subjected to a one-way transformation. Therefore the second authenticating station can not determine the secret information of the prover from the authentication response information. The first authenticating station only refers to the data base without performing any operation and transmits approval or disapproval information, indicating the result of authentication, the second authenticating station. The second authenticating station authenticates the prover according to the approval or disapproval information sent from the first authenticating station. As communication information is one-way transformed both in the communication between the prover station and the second authenticating station and the communication between the first authenticating station and the second authenticating station, there is no risk of leakage of information even if it is intercepted.

In the fourth and sixth embodiments, as the identification information of the prover is transmitted after being encrypted from the prover station to the second authenticating station, a third party can not determine the identification information. Furthermore, as key information used for the encryption dynamically varies according to the first variable parameter generated by the prover station, the identification information will not leak with the key decrypted. In addition to the identification information of the prover, other information (order information for goods, for example) may also be transmitted after being encrypted. As in the fifth and seventh embodiments, the identification information of the prover may be transmitted, being non-encrypted, with other information after being encrypted. It can be determined, according to use of the system to which the present invention is applied, what information is transmitted in the encrypted form.

In the first through seventh embodiments described above, random-number parameters may be used as the first and second variable parameters. In this case, as the first and second variable parameters irregularly vary every time, security of the data is further improved. When such a high security level is not required, parameters which regularly vary may be used.

Furthermore, in the first through seventh embodiments described above, if the secret information corresponding to the identification information of a prover is a positive integer $s_i$, p is a prime number, and g is an integer value which satisfies an inequality 1<g<p, then a remainder value obtained when $g^{s_i}$ is divided by the prime number p may be used as the transformed secret information. Furthermore, if h is a hash function, a remainder value obtained when $gh^{(s_i)}$ is divided by the prime number p may be used as the transformed secret information. The use of the hash function is effective especially when the secret information $s_i$ has a smaller number of digits. Varying the integer value g for every prover is effective to improve the security of the data. Similarly, it is effective to improve the security of the data to vary the hash function h for each prover.

These and other objects, features, aspects and advantages of the present invention will become more apparent from the following detailed description of the present invention when taken in conjunction with the accompanying drawings.

BRIEF DESCRIPTION OF THE DRAWINGS

FIG. 24 is a sequence chart showing operations of the fourth conventional example.

FIG. 25 is a sequence chart showing operations of the fifth conventional example.

DESCRIPTION OF THE PREFERRED EMBODIMENTS (1) First Embodiment

Figure 1:
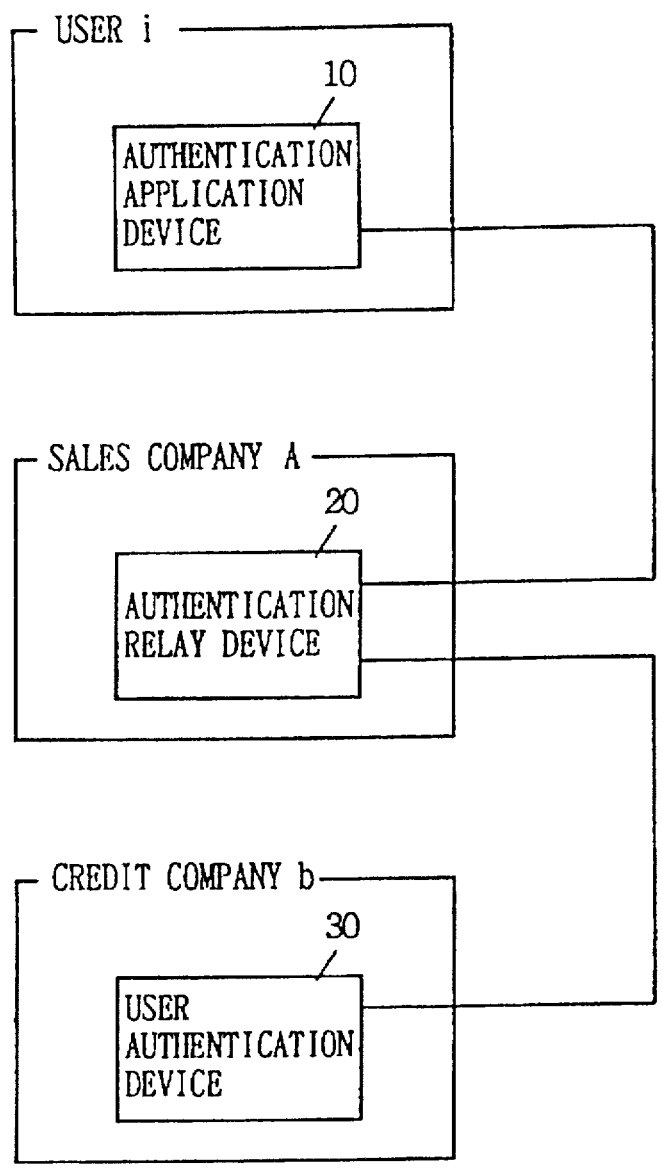
FIG. 1 is a block diagram showing a structure of a personal authentication system according to a first embodiment of the present invention.

FIG. 1 is a block diagram showing a configuration of a personal authentication system according to a first embodiment of the present invention. The personal authentication system of the first embodiment is formed of a plurality of users i, a sales company A and a credit company b. In the personal authentication system of the first embodiment, when payment is made with a credit card in a mail-order system through a network, the credit company b, requested by the sales company A, ascertains whether the user is a right user and informs the sales company A of the information.

In FIG. 1, an authentication application device 10 formed of a computer etc. is provided at the user i. An authentication relay device 20 formed of a computer etc. is provided at the sales company A. A user authentication device 30 formed of a computer etc. is provided at the credit company b. The user i is connected to the sales company A through personal computer communication to bidirectionally exchange information. The sales company A is connected to the user i and the credit company b through the personal computer communication to bidirectionally exchange information. The credit company b is connected to the sales company A through the personal computer communication to bidirectionally exchange information.

Figure 2:
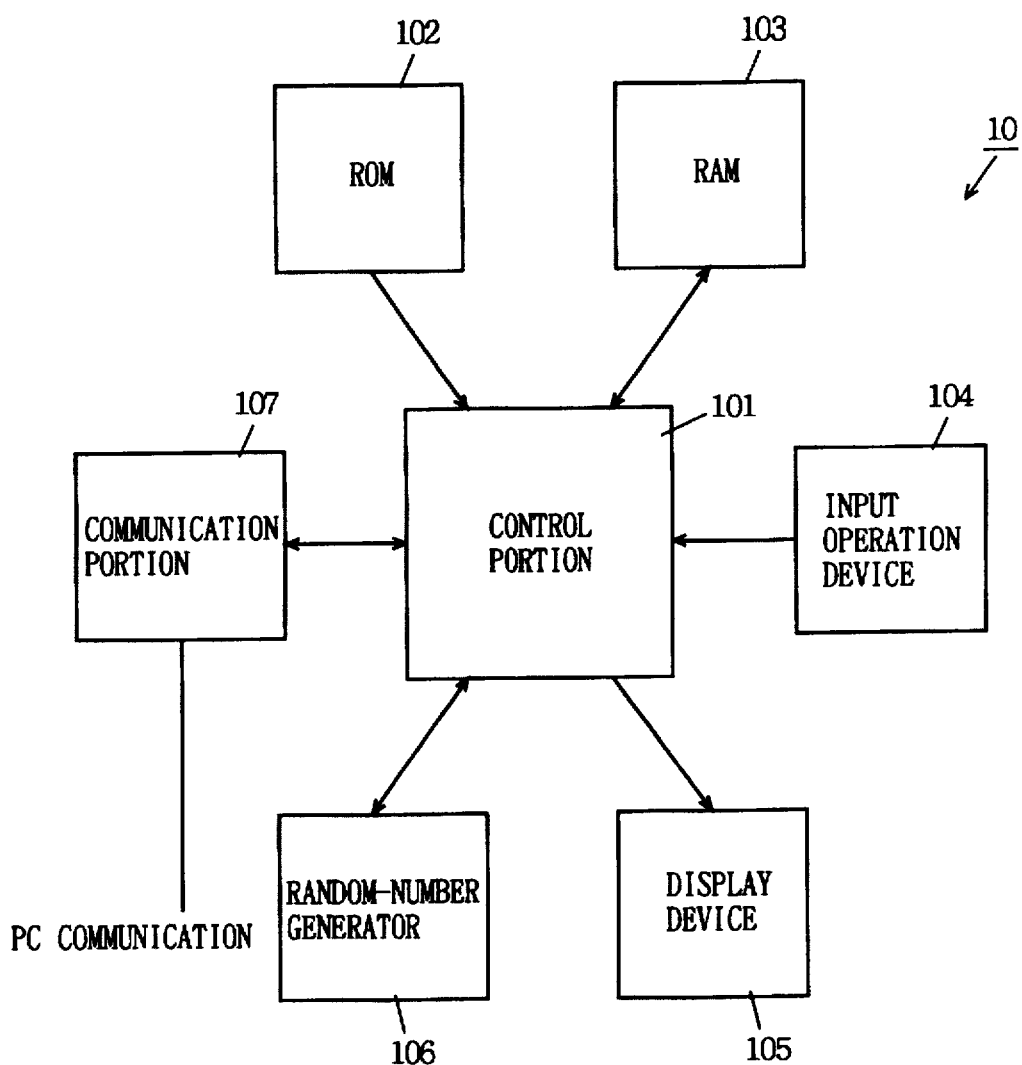
FIG. 2 is a block diagram showing an example of a structure of the authentication application device 10 provided at the user i, as shown in FIG. 1.

FIG. 2 is a block diagram showing an example of the configuration of the authentication application device 10 provided at the user i shown in FIG. 1. In FIG. 2, this authentication application device 10 includes a control portion 101, a ROM 102, a RAM 103, an input operation device 104, a display device 105, a random-number generator 106 and a communication portion 107.

The ROM 102 stores program data, according to which the control portion 101 operates. The RAM 103 stores various data necessary for operation of the control portion 101. The input operation device 104 includes a keyboard, a mouse, or the like operated by a user, for inputting various data and instructions into the control portion 101. The display device 105 includes a CRT display, or a liquid crystal display device, for displaying image data provided from the control portion 101. The random-number generator 106 generates random numbers necessary for authentication application. The communication portion 107 is connected to the sales company A through the personal computer communication to transmit/receive various data.

Figure 3:
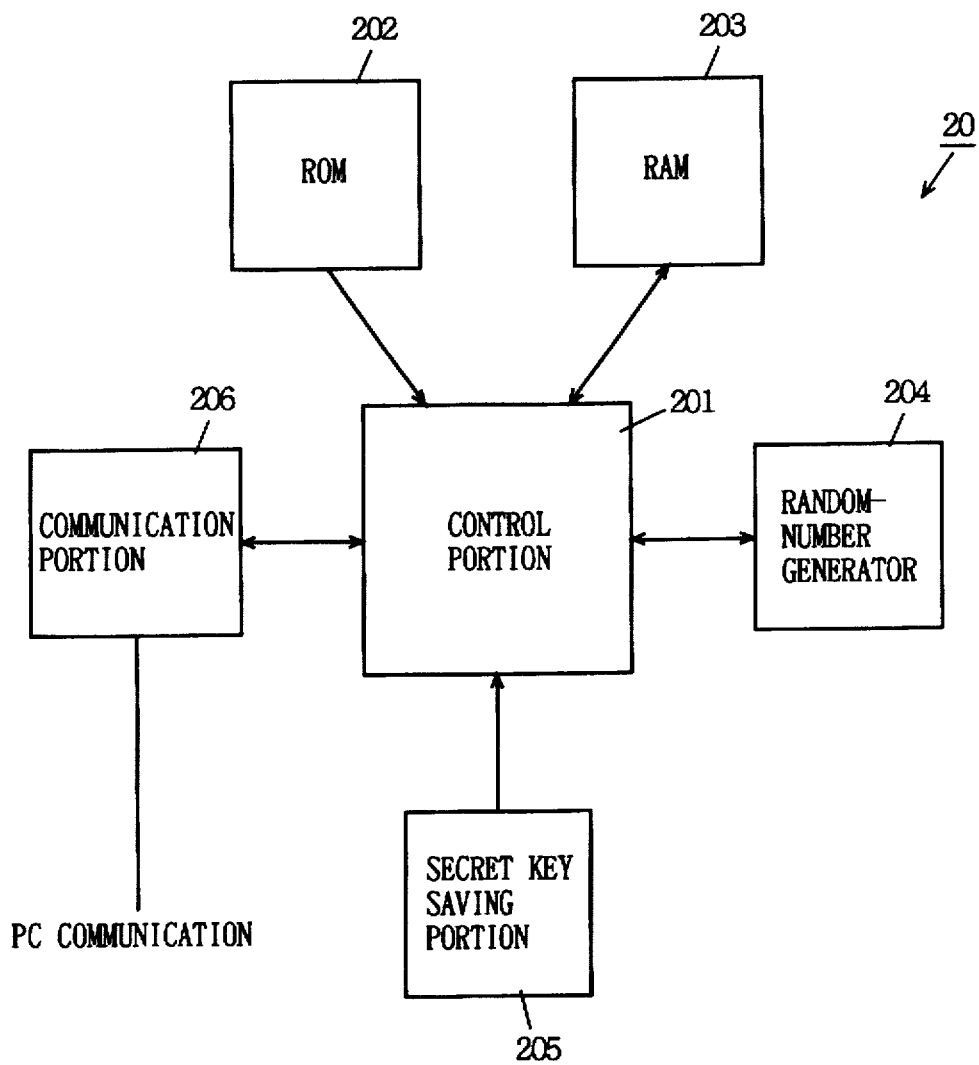
FIG. 3 is a block diagram showing an example of a structure of the authentication relay device 20 provided at the sales company A as shown in FIG. 1.

FIG. 3 is a block diagram showing an example of the structure of the authentication relay device 20 provided at the sales company shown in FIG. 1. In FIG. 3, this authentication relay device 20 includes a control portion 201, a ROM 202, a RAM 203, a random-number generator 204, a secret key saving portion 205 and a communication portion 206.

The ROM 202 stores program data used for operating the control portion 201. The RAM 203 stores various data necessary for the operation of the control portion 201. The random-number generator 204 generates random numbers necessary to generate authentication challenge information.

The secret key saving portion 205 saves secret keys which are needed to make crypto-graphic communication with the credit company b, so that they can not read from the outside. The communication portion 206 is connected to each user and the credit company b through the personal computer communication to transmit/receive various data.

Figure 4:
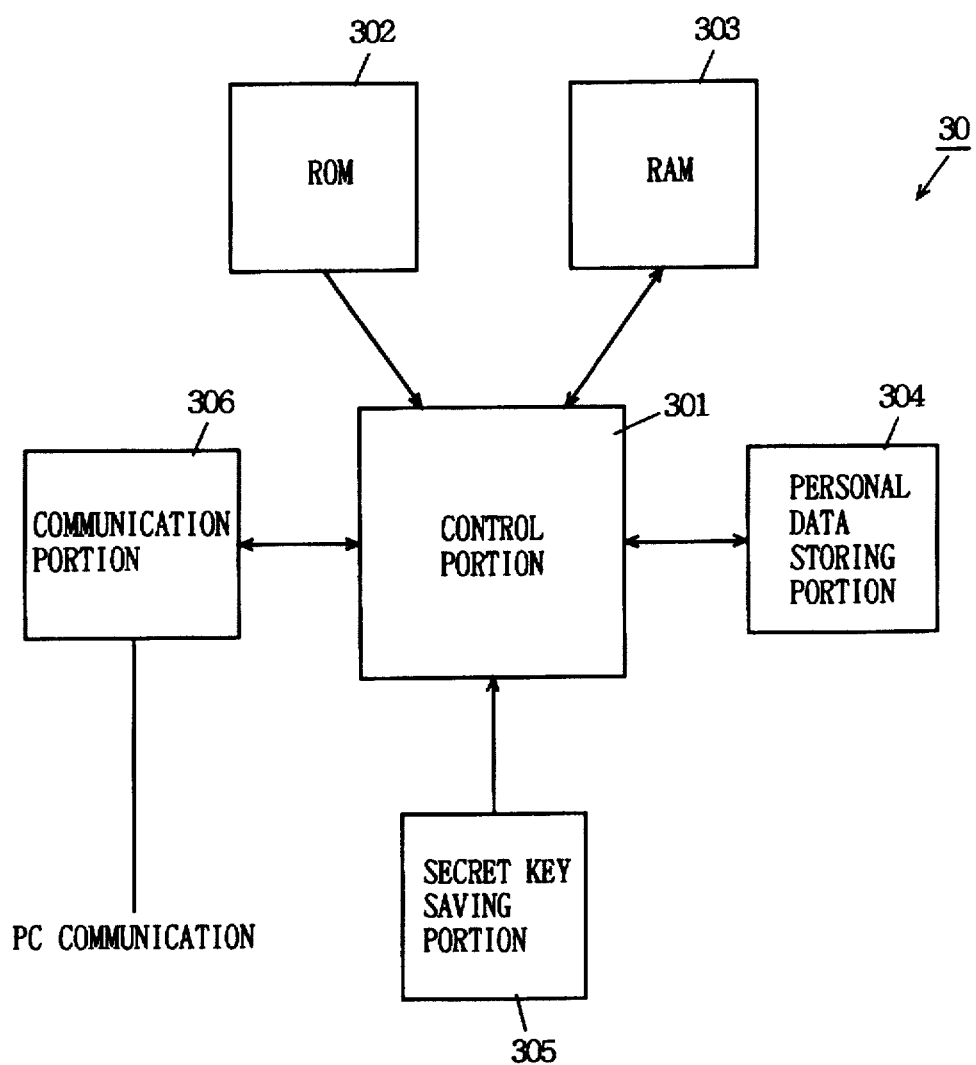
FIG. 4 is a block diagram showing an example of a structure of the user authentication device 30 provided at the credit company B as shown in FIG. 1.

FIG. 4 is a block diagram showing an example of the structure of the user authentication device 30 provided at the credit company b shown in FIG. 1. In FIG. 4, this user authentication device 30 includes a control portion 301, a ROM 302, a RAM 303, a personal data storing portion 304, a secret key saving portion 305 and a communication portion 306.

The ROM 302 stores program data used for operating the control portion 301. The RAM 303 stores various data necessary for operation of the control portion 301. The personal data storing portion 304 stores identification numbers of individual users and transformed secret information so that they can not be read from the outside. The secret key saving portion 305 saves secret keys which are needed to make cryptographic communication with the sales company A, so that they can not be read externally. The communication portion 306 is connected to the sales company A through the personal computer communication to transmit/receive various data.

Figure 5:
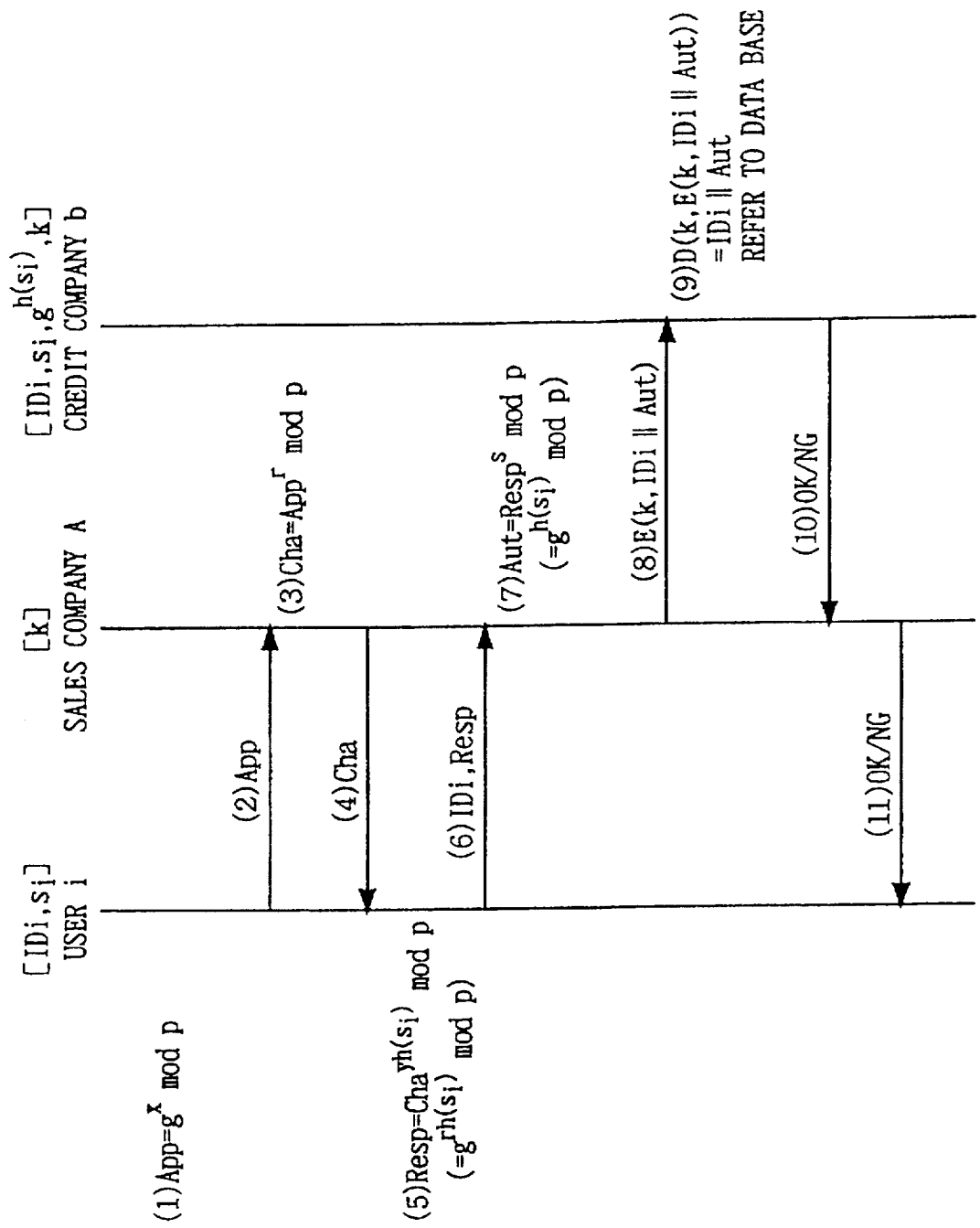
FIG. 5 is a sequence chart showing operations of the personal authentication system of the first embodiment.
Figure 6:
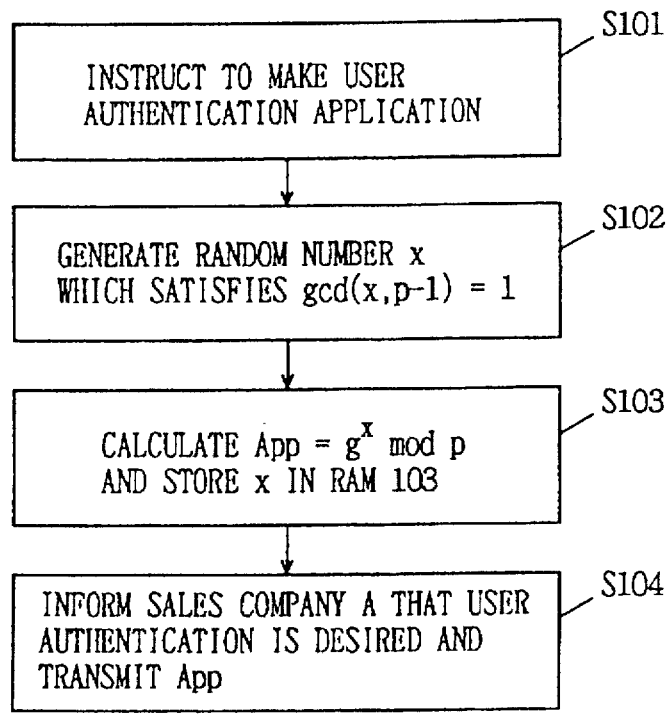
FIG. 6 is a flow chart showing operations for making an application for authentication of the authentication application device 10 of the first embodiment.
Figure 7:
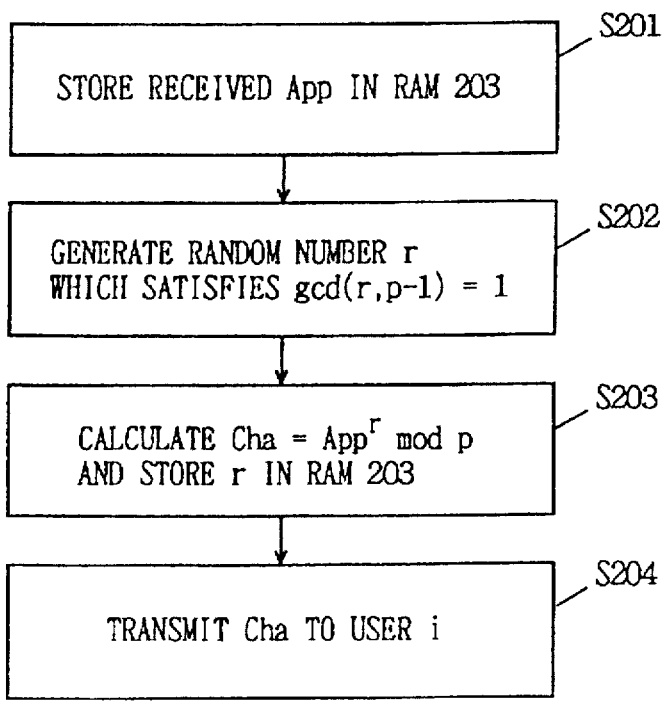
FIG. 7 is a flow chart showing operations for generating authentication challenge information of the authentication relay device 20 of the first embodiment.
Figure 8:
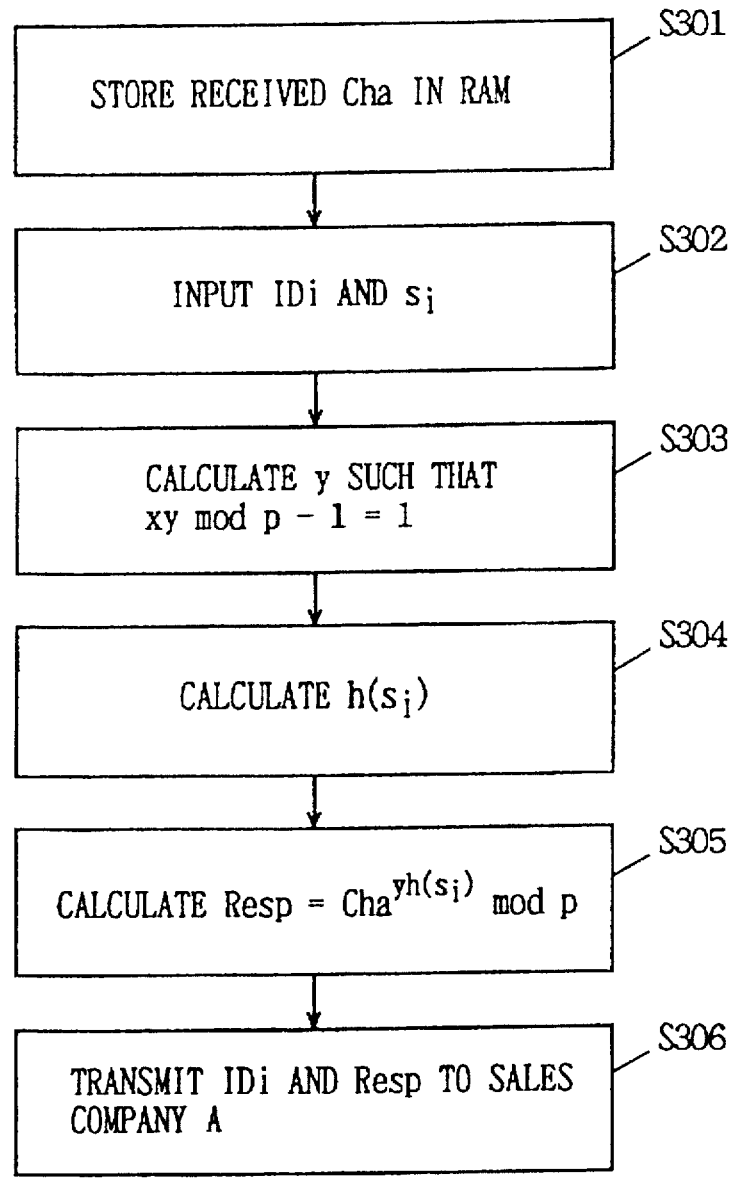
FIG. 8 is a flow chart showing operations for generating authentication response information of the authentication application device 10 of the first embodiment.
Figure 9:
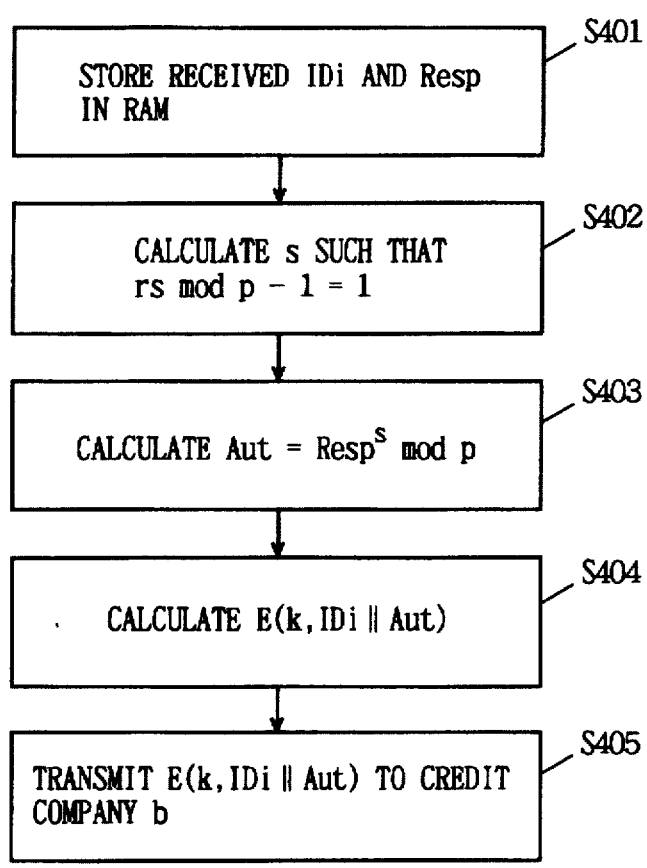
FIG. 9 is a flow chart showing operations for generating authentication reference information of the authentication relay device 20 of the first embodiment.
Figure 10:
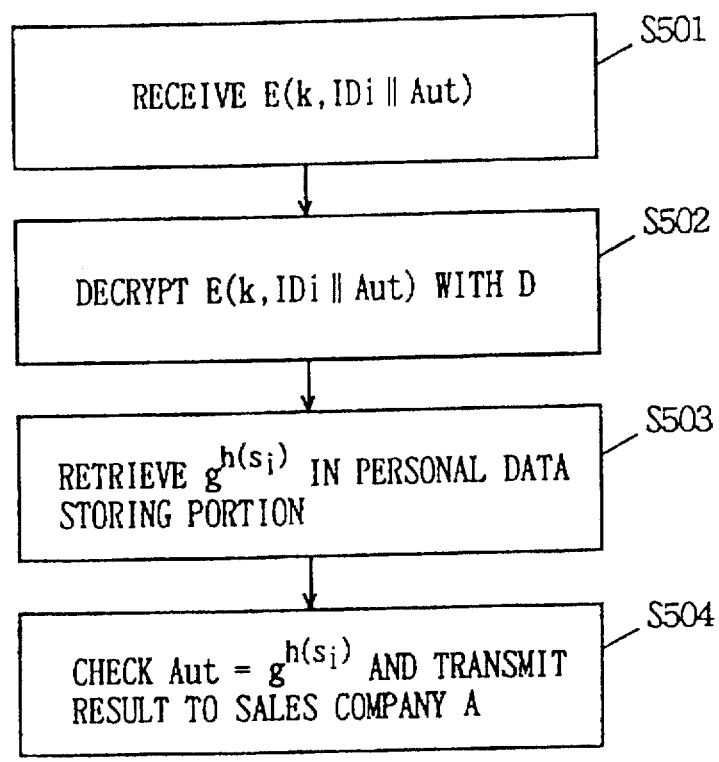
FIG. 10 is a flow chart showing operations for user authentication check of the user authentication device 30 of the first embodiment.

FIG. 5 is a sequence chart showing operations of the entirety of the personal authentication system of the first embodiment shown in FIG. 1. FIG. 6 is a flow chart showing operations for authentication application device 10 of FIG. 1. The operations correspond to (1) in FIG. 5. FIG. 7 is a flow chart showing operations for generating authentication challenge information of the authentication relay device 20 of FIG. 1. The operations correspond to (3) in FIG. 5. FIG. 8 is a flow chart showing operations of the authentication application device 10 of FIG. 1 for generating authentication response information. The operations correspond to (5) in FIG. 5. FIG. 9 is a flow chart showing operations of the authentication relay device 20 of FIG. 1 for generating authentication reference information. The operations correspond to (7) of FIG. 5. FIG. 10 is a flow chart showing operations of the user authentication device 30 of FIG. 1 for user authentication check. The operations correspond to (9) of FIG. 5. Now, referring to FIG. 5 through FIG. 10, operations of the first embodiment will be described.

In this system, user authentication is made by operation in a finite field with modulo p which is a large prime number p of about 512 bits. The p is predetermined for the system, which is provided to each user i, the sales company A and the credit company b. An integer g which satisfies an inequality $1<g<p$ is used in common, which is provided to each user i and the credit company b. Furthermore, a function h is a function for generating an integer value satisfying $0<h(x)<p-1$ from an arbitrary non-negative integer x, in which it is difficult to derive x from h(x). The function h is provided to each user i and the credit company b. Such a function h is called a hash function, whose existence and applicability are described in detail in *Introduction to Theory of Cryptography (Ango Riron Nyumon)* (Kyoritsu Shuppan) written by Eiji Okamoto.

Each user is provided with an identification number IDi at the time of registration for membership to the credit company b. Each user also informs the credit company b of a non-negative integer $s_i$, which is a password of the user. The credit company b calculates transformed secret information $\{g^{h(s_i)} \bmod p\}$ using the password si and the function h in advance, which is stored in the personal data storing portion 304 in a set with the identification number IDi and the password $s_i$. The $\alpha \bmod \beta$ indicates a remainder when $\alpha$ is divided by $\beta$. The sales company A and the credit company b share a secret key k in advance, which is stored in the secret key saving portion 205 and the secret key saving portion 305, respectively. The sales company A and the credit company b hold a secret key encryption algorithm E and a secret key decryption algorithm D.

When the user i makes an application for authentication directly to the credit company b, the user i presents his/her identification number IDi and a password $s_i$ to the credit company. The credit company b refers to the personal data storing portion 304 with the presented IDi, and authenticates the user when the stored password is equal to the presented value, and does not authenticate the user when they are not equal.

Next, a procedure will be described in the case where the sales company b performs authentication of the user i. The processing shown below is all performed in the real-time processing.

When a user i purchases goods of the sales company A in a mail-order system through a network and makes payment with a credit card, the sales company A authenticates whether the user i is a correct user with a help of the credit company. That is to say, the user i instructs the authentication application device 10 to make a user authentication application. (Step S101 in FIG. 6) The control portion 101 in the authentication application device 10 responds by generating a random-number parameter x using the random-number generator 106. (Step S102) At this time the random-number parameter x is an integer which satisfies the conditions:

$0<X<p-1$ $\gcd(x, p-1)=1$.

Note that $\gcd(\alpha, \beta)$ indicates the greatest common divisor of $\alpha$ and $\beta$. Next, the control portion 101 computes authentication application information App as $App=g^x \bmod p$ using this random-number parameter x and stores the random-number parameter x in the RAM 103. (Step S103) Next, the control portion 101 informs the sales company A that user authentication is desired through the communication portion 107 by way of personal computer communication and transmits the authentication application information App. (Step S104)

At the sales company A, the control portion 201 stores the authentication application information App received from the user i through the communication portion 206 in the RAM 203. (Step S201 in FIG. 7) Next, the control portion 201 generates a random-number parameter r using the random-number generator 204. (Step S202) At this time, the random-number parameter r is an integer which satisfies the conditions:

$0<r<p-1$ $\gcd(r, p-1)=1$.

Next, the control portion 201 fetches the authentication application information App from the RAM 203, calculates authentication challenge information Cha using this random-number parameter r as $Cha=App^r \bmod p = g^{xr} \bmod p$ and stores the random-number parameter r in the RAM 203. (Step S203) Next, the control portion 201 transmits the authentication challenge information Cha to the user i through the communication portion 206 by way of the personal computer communication. (Step S204)

At the user i, the control portion 101 stores the authentication challenge information Cha received from the sales company A through the communication portion 107 into the RAM 103. (Step S301 in FIG. 8) Next, the user i inputs his/her identification number IDi for credit membership and a password $S_i$. (Step S302) Next, the control portion 101 reads the random-number parameter x stored in the RAM 103 and computes an integer y which satisfies the conditions:

xy mod p−1=1

0<y<p−1.

(Step S303) Then, as gcd (x, p−1)=1 so such y necessarily exists. An algorithm for obtaining such y is described in detail in *Current Cryptography Theory (Genzai Ango Riron)* written by Shinichi Ikeno, Kenji Koyama (Electronic Information Communication Society).

Next, the control portion 101 substitutes the inputted password si into the hash function h to compute a hash value h(si). (Step S304) Then, the control portion 101 fetches the authentication challenge information Cha from the RAM 103 and computes authentication response information Resp for Cha as Resp=Cha$y^{h(si)}$ mod p =$g^{xyh(si)}$ mod p.

(Step S305) At this time, $a^{p-1}$ mod p=1 holds for an arbitrary integer a which satisfies 0<a<p. This is described in detail in *Current Cryltoaraphy Theory (Genzai Ancfo Riron)* written by Shinichi Ikeno, Kenji Koyama (Electronic Information Communication Society). Further, from xy mod p−1=1, then, xy=n (p−1)+1 (n is an integer.) Accordingly, $$\begin{aligned}
\text{Resp} &= gxr^{yh(si)} & \text{mod p} \\
&= (g^{xy})^{y(si)} & \text{mod p} \\
&= [g^{(n(p-1)+1)}]^{rh(si)} & \text{mod p} \\
&= [\{g^{(p-1)}\}^n \times g]^{rh(si)} & \text{mod p} \\
&= (1^n \times g)^{yh(si)} & \text{mod p} \\
&= g^{rh(si)} & \text{mod p}
\end{aligned}$$

Then the control portion 101 transmits the identification number IDi of the user i and the authentication response information Resp to the sales company A through the communication portion 107 by the personal computer communication. (Step S306)

At the sales company A, the control portion 201 stores the identification number IDi at the authentication response information Resp received from the user i through the communication portion 206 in RAM 203. (Step S401 in FIG. 9) Next, the control portion 201 reads the random-number parameter r stored in the RAM 203 and calculates an integer s which satisfies the conditions:

rs mod p−1=1

0<s<p−1

(Step S402). At this time, as gcd (r, p−1)=1, so this s always exists.

Next, the control portion 201 fetches the authentication response information Resp from the RAM 203 and computes authentication reference information Aut as $$\begin{aligned}
\text{Aut} &= \text{Resp}^s \text{ mod p} \\
&= g^{rh(si)s} \text{ mod p.}
\end{aligned}$$

(Step S403) At this time, as rs mod p−1 = 1 is satisfied, so

Aut = $g^{h(si)}$ mod p because of the same reason described in the Step S305. Next, the control portion 201 fetches the identification number IDi of the user i stored in the RAM 203, reads the secret key k stored in the secret key saving portion 205 and, using them as keys, encrypts a connection of the identification number IDi and the authentication reference information Aut with the secret key encryption algorithm E as E(k, IDi‖Aut).

(Step S404) The character "‖" designates concatenation of information. The control portion 201 transmits E (k, IDi‖Aut) to the credit company b through the communication portion 206 by the personal computer communication (Step S405)

At the credit company b, the control portion 301 receives E(k, IDi‖Aut) transmitted from the sales company a through the communication portion 306. (Step S501 in FIG. 10) Next, the control portion 301 reads the secret key k stored in the secret key saving portion 305 and, using it as a key, decrypts E (k, IDi‖Aut) with the decryption algorithm D as D {k, E (k, IDi‖Aut)}=IDi‖Aut (Step S502)

Next, the control portion 301 retrieves and reads the transformed secret information {gb(siD mod p} stored in a set with the decrypted identification number IDi from the personal data storing portion 304. (Step S503) Next, the control portion 301 checks if the decrypted authentication reference information Aut and the value of {$g^{h(si)}$ mod p} read from the personal data storing portion 304 match. (Step S504) Next, the control portion 301 transmits the result of the check to the sales company A through the communication portion 306. (Step S504)

At the sales company A, the control portion 201 receives, through the communication portion 206, the result of the check transmitted from the credit company b, and when the authentication is approved by the credit company, it makes transmission to the user i to prompt the user i to make an order for goods, and when the authentication is disapproved, it transmits to the user i that authentication was not made.

At the user i, the control portion 101 receives the information sent from the sales company A, and when instructed to order goods, it displays information for prompting an order for goods in the display device 105. Subsequently, the user i operates to order goods. If the control portion 101 receives disapproval of the authentication, it displays the absence of authentication in the display device 105.

As has been described above, in the personal authentication system of the first embodiment, the credit company b can ascertain whether the user i is a right user i or not only by referring to the data base without letting the sales company A know the password si of the user i. This is due to the fact that is extremely difficult, even if the value of g is known, to obtain h($s_i$) from the information {$g^{h(si)}$ mod p} which the sales company A could know if the value of p is large (which is a value of about 512 bits in the above-described first embodiment). The problem of obtaining X from Y, g and p when there exists the relation:

y=$g^x$ mod p is called "a discrete logarithm problem." The difficulty of solving the "discrete logarithm problem" is described in detail in *Current Cryptography Theory (Genzai Ango Riron)* written by Shinichi Ikeno, Kenji Koyama (Electronic Information Communication Society).

Furthermore, as the password $s_i$ of the user i which is inputted by the user i into the authentication application device 10 is usually a number of about four decimal digits. In this case, even if the sales company A which knows the value of $$g^{h(s_i)} \bmod p$$

tries to find the value of $s_i$ by applying values of $s_i$ in all cases, it is impossible to find the value of $s_i$ because the function h is not actually provided to the sales company A.

When an IC card is provided to an authentication application device at each user to control a password of the user i with the IC card, then the value of $s_i$ does not have to be such a small value of about four decimal digits, which removes the necessity of use of the function h. In this case, however, the use of the function h will further improve the security.

If someone taps the line of the personal computer communication between the user i and the sales company A, the value of $\{g^{h(s_i)} \bmod p\}$ can not be know. This is due to the fact that transmitted on the line of the personal computer communication are information of App=$g^x$ mod p
Cha=$g^r$ mod p
Resp=$g^{rh(s_i)}$ mod p and finding the value of the $g^{h(s_i)}$ mod p from Resp requires the value of the random-number parameter r. The "discrete logarithm problem" has to be solved to obtain the value of the random-number parameter r from App and Cha, which is practically impossible.

Furthermore, when the identification number IDi and the authentication reference information Aut are transmitted between the sales company A and the credit company b, they are encrypted with the secret key k which is shared by the two, so that intercepting them is useless.

As has been described above, in the first embodiment, nobody except the user i could know the password $s_i$ of the user i, and the operations in the embodiment can authenticate the user i as a right user.

In the first embodiment, although the value of g is a value common in the personal authentication system of the embodiment, the value of g may be varied for every user. In this case, the user i determines the value of g and computes $\{g^{h(s_i)} \bmod p\}$, and informs the credit company b of it. In this case, as the value of g itself is secret, the security is further improved. Similarly, the hash function h may be varied for every user, which will also further improve the security.

Although the bidirectional communication between the user i, the sales company A and the credit company b is made using the personal computer communication in the first embodiment, the communication can be made so as to produce the same effects by using the digital CATV network, B-ISDN, etc. which implement bidirectional communication.

(2) Second Embodiment

A second embodiment of the present invention is a personal authentication system using the same structure as that of the personal authentication system described in the first embodiment. The second embodiment can be implemented with the same structure as that in the first embodiment, but the procedure of execution is different. Settings in the system are also almost the same, but a value of the integer value g, which is common in the system, is also provided for the sales company A. Accordingly, the second embodiment will now be described while incorporating the structure of the personal authentication system of FIG. 1.

Figure 11:
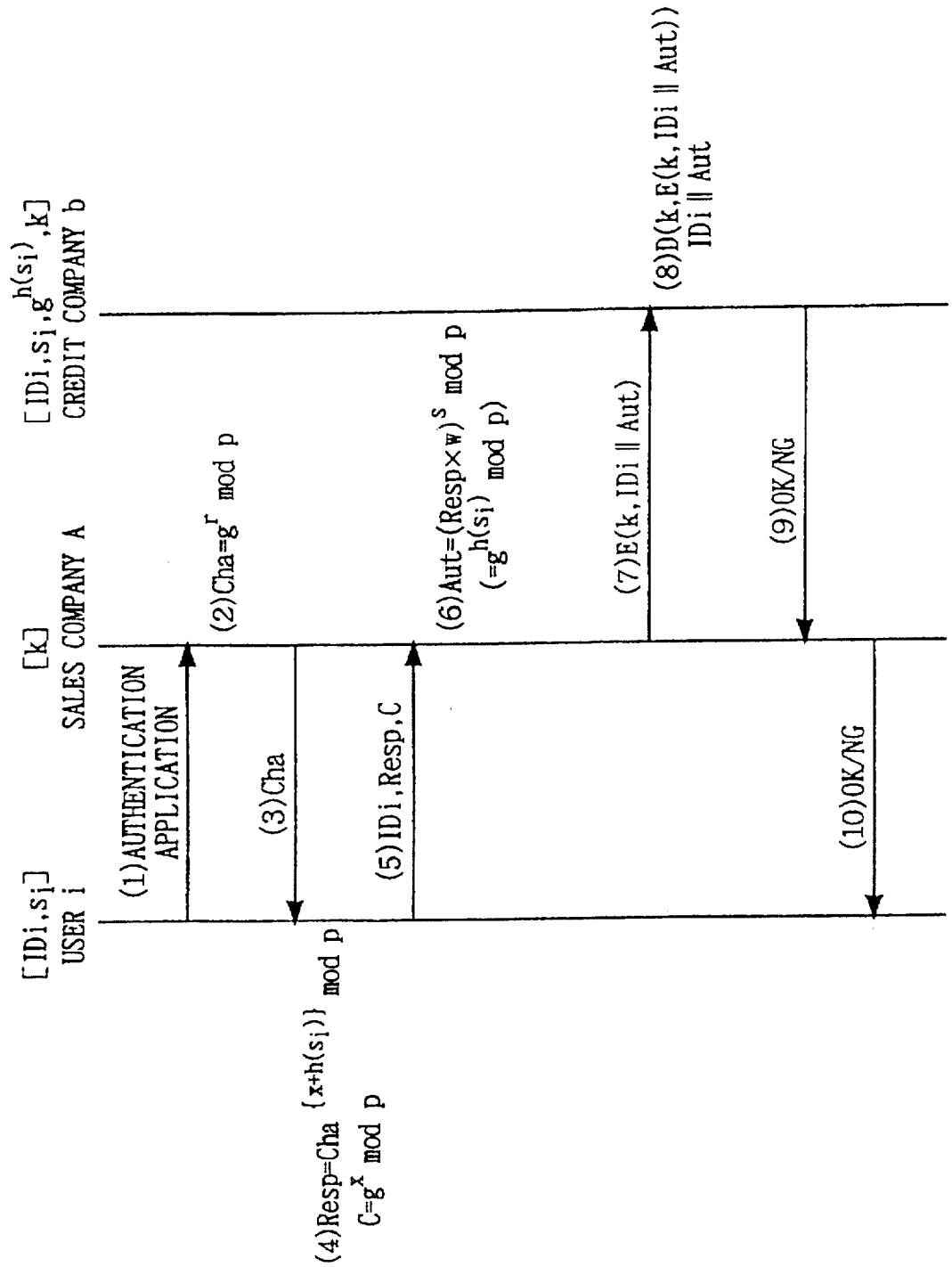
FIG. 11 is a sequence chart showing operations of a personal authentication system of a second embodiment.
Figure 12:
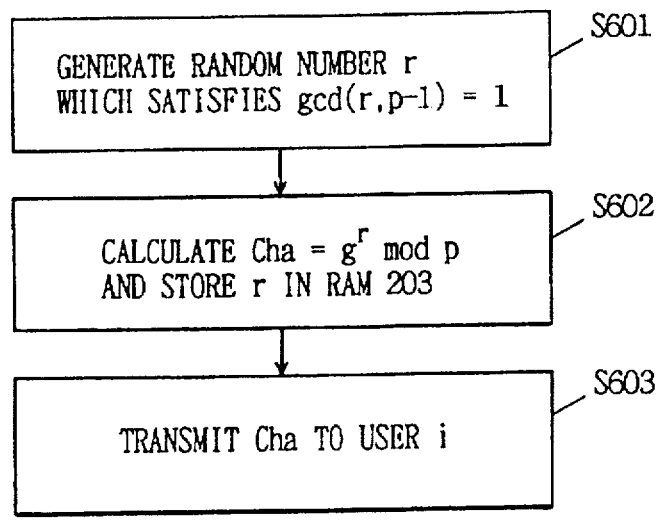
FIG. 12 is a flow chart showing operations for generating authentication challenge information of the authentication relay device 20 of the second embodiment.
Figure 13:
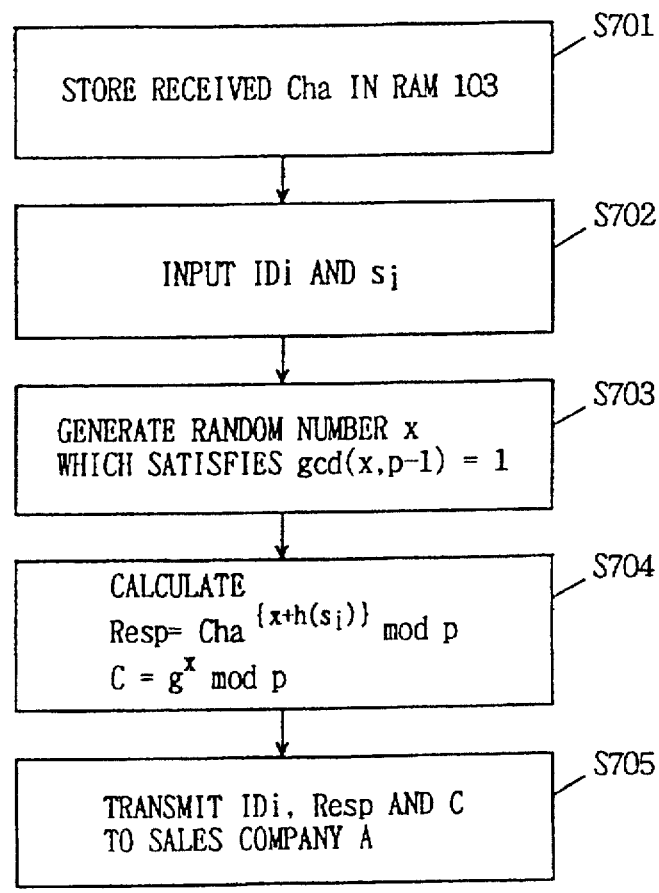
FIG. 13 is a flow chart showing operations for generating authentication response information of the authentication application device 10 of the second embodiment.
Figure 14:
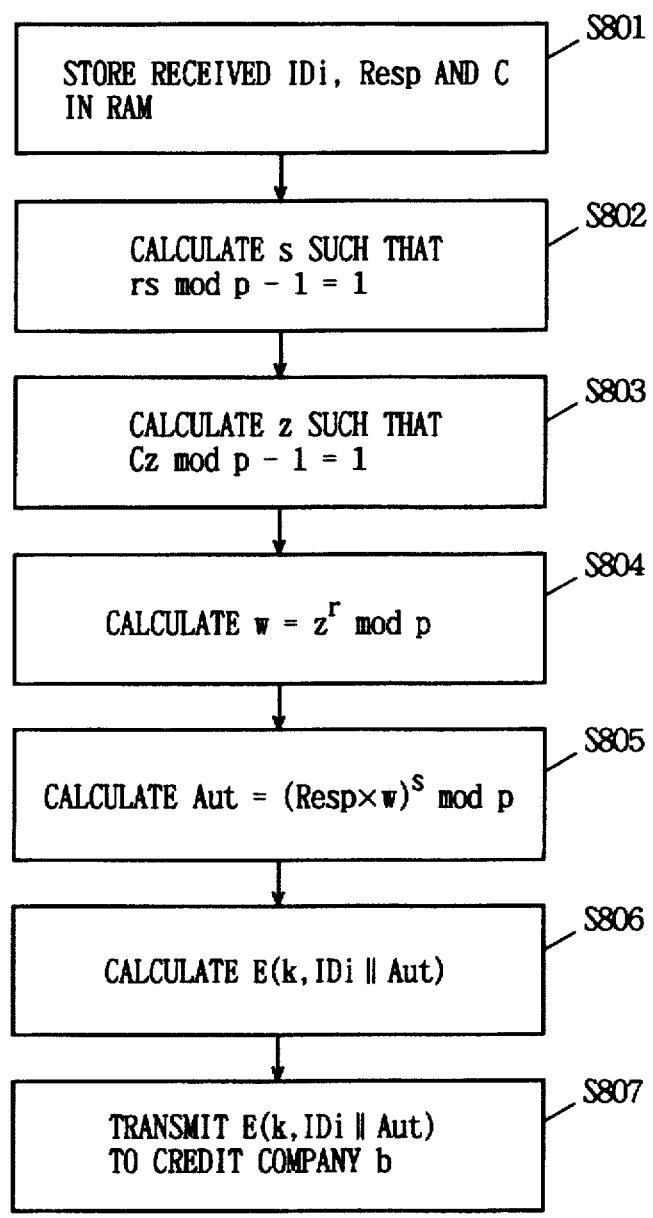
FIG. 14 is a flow chart showing operations for generating authentication reference information of the authentication relay device 20 of the second embodiment.
Figure 15:
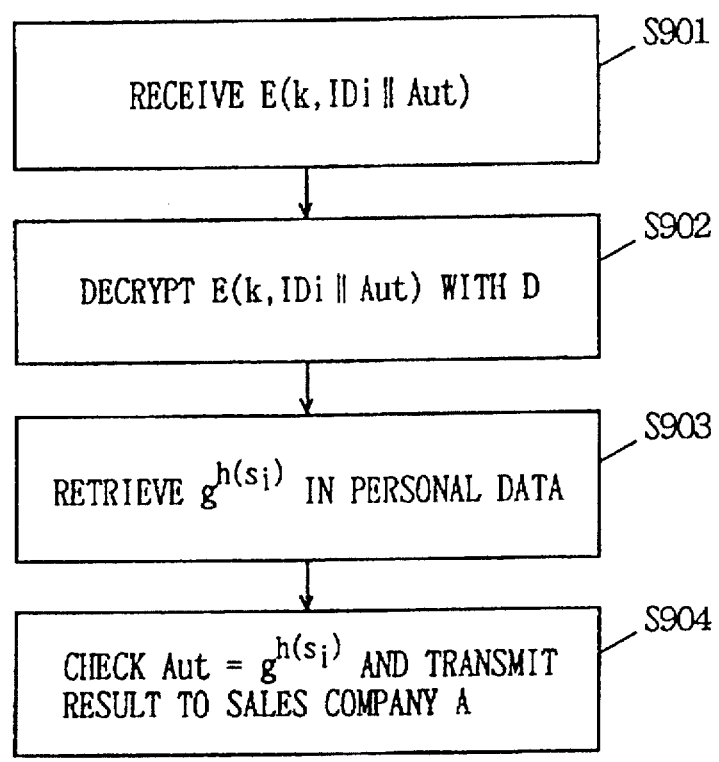
FIG. 15 is a flow chart showing operations for user authentication check of the user authentication device 30 of the second embodiment.

FIG. 11 is a sequence chart showing operations of the personal authentication system of the second embodiment. FIG. 12 is a flow chart showing operations in the second embodiment for generating authentication challenge information of the authentication rely device 20 of FIG. 1. The operations correspond to (2) in FIG. 11. FIG. 13 is a flow chart showing operations for generating authentication response information in the second embodiment of the authentication application device 10 of FIG. 1. The operations correspond to (4) in FIG. 11. FIG. 14 is a flow chart showing operations in the second embodiment of the authentication relay device 20 of FIG. 1 for generating authentication reference information. The operations correspond to (6) in FIG. 11. FIG. 15 is a flow chart showing operations in the second embodiment of the user authentication device 30 of FIG. 1 for checking for user authentication. The operations correspond to (8) of FIG. 11. Now, referring to FIG. 11 through FIG. 15, operations in the second embodiment will be described while incorporating the structure described in the first embodiment.

When the user i makes an application for authentication directly to the credit company b, the user i presents his/her identification number IDi and a password si to the credit company. The credit company b refers to the personal data storing portion 304 with the presented IDi, and authenticates the user when the stored password is equal to the presented value, and does not authenticate the user when they are not equal.

Next, the procedure, when the sales company A makes authentication of the user i, will be described. The following processings are all performed in the real-time processings.

When a user i buys goods of the sales company A in a mail-order system through network, if payment is to be made with a credit card, the user i has to be authenticated as a user by the credit company before making an order. At this time, the user i instructs the authentication application device to make an application for user authentication. The control portion 101 responds by informing the sales company A of the application for user authentication by the personal computer communication through the communication portion 107.

At the sales company A, a random-number parameter r is generated by using the random-number generator 204. (Step S601 in FIG. 12) At this time, the random-number parameter r is an integer which satisfies the conditions:

$$0 < r < p-1$$

$$\gcd(r, p-1) = 1.$$

Next, the control portion 201 calculates authentication challenge information Cha using this random-number parameter r as Cha=$g^r$ mod p and stores the random-number parameter r in the RAM 203. (Step S602) Next, the control portion 201 transmits the authentication challenge information Cha to the user i through the communication portion 206 by way of the personal computer communication. (Step S603)

At the user i, the control portion 101 stores the authentication challenge information Cha received from the sales company A through the communication portion 107 into the RAM 103. (Step S701 in FIG. 13) Next, the user i inputs his/her identification number IDi for credit membership and a password $S_i$. (Step S702) Next, the control portion 101 generates a random-number parameter x by using the random-number generator 106. (Step S703) At this time, the random-number parameter x is an integer which satisfies the conditions:

$0 < x < p-1$ $\gcd(x, p-1) = 1$

Note that $\gcd(\alpha, \beta)$ indicates the greatest common divisor of $\alpha$ and $\beta$. Next, the control portion 101 fetches the authentication challenge information Cha from the RAM 103 and, using the random-number parameter x, calculates first authentication response information Resp and second authentication response information C as $\text{Resp} = \text{Cha}^{\{x+h(s_i)\}} \mod p$ $C = g^x \mod p$.

(Step S704) Next, the control portion 101 transmits to the sales company, through the communication portion 107, the identification number IDi of the user i and the first and second authentication response information Resp and C by the personal computer communication. (Step S705)

At the sales company A, the control portion 201 stores the identification number IDi and the first and second authentication response information Resp and C received from the user i through the communication portion 206 in the RAM 203. (Step S801 in FIG. 14) Next, the control portion 201 reads the random-number parameter r stored in the RAM 203 and calculates an integer s ($0 < s < p-1$) which satisfies $rs \mod p-1 = 1$.

(Step S802). At this time, as $\gcd(r, p-1) = 1$, so this s always exists. Then the control portion 201 reads the second authentication response information C from the RAM 203 and calculates an integer z ($0 < z$ p) which satisfies $Cz \mod p = 1$.

(Step S803) At this time, as $1 < g < p$ $C = g^x \mod p$ and, $\gcd(C, p) = 1$, such that z necessarily exists. Then, the control portion 201 calculates w as $w = z^r \mod p$.

(Step S804) At this time, as z is considered to be $z = C^{-1} \mod p$, then w is considered to be $w = g^{-xr} \mod p$.

Next, the control portion 201 calculates authentication reference information Aut as $\text{Aut} = (\text{Resp} \times w)^s \mod p$
$= [g^{r\{x+h(s_i)\} - xr}]^s \mod p$
$= \{g^{rh(s_i)}\}^s \mod p$ (Step S805) At this time, as $rs \mod p-1 = 1$ is satisfied, so $\text{Aut} = g^{h(s_i)} \mod p$ because of the same reason described in the Step S305 in the first embodiment. Next, the control portion 201 fetches the identification number IDi stored in the RAM 203, reads the secret key k stored in the secret key saving portion 205 and, using them as keys, encrypts a connection of the identification number IDi and the authentication reference information Aut with the secret key encryption algorithm E defined as $E(k, \text{IDi}\|\text{Aut})$.

(Step S806) The character "||" designates concatenation of information. The control portion 201 then transmits $E(k, \text{IDi}\|\text{Aut})$ to the credit company b through the communication portion 206 by the personal computer communication. (Step S807)

At the credit company b, the control portion 301 receives $E(k, \text{IDi}\|\text{Aut})$ transmitted from the sales company A through the communication portion 306. (Step S901 in FIG. 15) Next, the control portion 301 reads the secret key k stored in the secret key saving portion 305 and, using it as a key, decrypts $E(k, \text{IDi}\|\text{Aut})$ with the decryption algorithm D as $D\{k, E(k, \text{IDi}\|\text{Aut})\} = \text{IDi}\|\text{Aut}$ (Step S902)

Next, the control portion 301 retrieves and reads the transformed secret information $\{g^{h(s_i)} \mod p\}$ stored in a set with the decrypted identification number IDi from the personal data storing portion 304. (Step S903) Next, the control portion 301 checks if the decrypted authentication reference information Aut and the value of the transformed secret information $\{g^{h(s_i)} \mod p\}$ read from the personal data storing portion 304 match. (Step S904) Next, the control portion 301 transmits the result of the check to the sales company A through the communication portion 306. (Step S904)

At the sales company A, the control portion 201 receives the result of check transmitted from the credit company b through the communication portion 206, and when the control portion 201 receives authentication by the credit company, it makes a transmission to the user i to prompt the user i to make an order for goods, and when the control portion 201 cannot receive authentication, it transmits to the user i that authentication was not made.

At the user i, the control portion 101 receives information sent from the sales company A, and when instructed to order goods, the control portion 101 displays information for prompting the user to make an order for goods in the display device 105. Subsequently, the user i orders goods. If the control portion 101 receives an indication that authentication cannot be made, it displays the absence of authentication in the display device 105.

As described above, in the personal authentication system of the second embodiment, the credit company b can ascertain whether the user i is a right user i or not by only referring to the data base without releasing, to the sales company A, the password si of the user i. This is due to the fact that it is extremely difficult, even if the value of g is known, to obtain $h(s_i)$ from the information $\{g^{h(s_i)} \mod p\}$ which the sales company A can determine if the value of p is large (which is a value of about 512 bits in the above-described second embodiment.)

The case where the password $s_i$ of the user i is a small number can be considered in the same way as the first embodiment.

When an IC card is provided to an authentication application device at each user to control a password of the user i with the IC card, then the value of $s_i$ does not have to be a small value of about four decimal digits, which removes the necessity of use of the function h. In this case, however, the user of the function h will further improve the security.

Also, as stated in the first embodiment, if someone taps the line of the personal computer communication between the user i and the sales company A, the value of $\{g^{h(s_i)} \mod p\}$ cannot be determined. This is due to the fact that transmitted on the line of the personal computer communication is information of $\text{Cha} = g^r \mod p$ $\text{Resp} = g^{r\{x+h(s_i)\}} \mod p$ $C = g^x \mod p$ and finding the value of the $\{g^{h(s_i)} \mod p\}$ from Resp requires the values of the random-number parameters r and x. The "discrete logarithm problem" has to be solved to obtain the values of the random-number parameters r and x from Cha and C, which is practically impossible.

Furthermore, when the IDi and Aut are transmitted between the sales company A and the credit company b, they are encrypted with the secret key k which is shared by the two companies, so that intercepting them is useless.

Although the random-number parameter x is included in the first authentication response information Resp transmitted from the user i to the sales company A so as to improve security of transmission data in the second embodiment, when only a certain level of security is necessary, authentication response information Resp' ($=Cha^{h(s)}$) including no random-number parameter x may be transmitted from the user i to the sales company A. In this case, as the sales company A does not have to exclude the random-number parameter x from the authentication response information, the user i does not have to transmit the second authentication response information C to the sales company.

Although the value of g is a value common in the personal authentication system in the second embodiment, the value of g can be changed for every user. In this case, the user i determines the value of g and computes $\{g^{h(s)} \mod p\}$, and informs the credit company b of it. In this case, as the value of g itself is secret, the security is further improved. Similarly, the hash function h may be varied for every user, which also further improves the security.

As has been described above, also in the second embodiment, nobody except the user i can know the password of the user i and operations in the embodiment can authenticate that the user i as a right user.

Although the bidirectional communication between the user i, the sales company A and the credit company b is made using the personal computer communication in the second embodiment, the communication can be made to produce the same effects by using the digital CATV network, B-ISDN, etc. which can implement bidirectional communication.

(3) Third Embodiment

A third embodiment of the present invention is a personal authentication system using the same structure as that of the personal authentication system described in the first embodiment. It can be implemented with the same structure as the first embodiment, but when a user i is authenticated as a correct user in this system, a common key can be generated between the user i and the sales company A, which is known only to the two, and the user i and the sales company A can make cryptographic communication. Settings in the system are also almost the same, but the user i is provided with a public key of the sales company A, which is stored in the ROM 102. This public key of the sales company A is managed by publications such as a telephone book or a public data base, which can easily be acquired by anybody. The sales company A determines a secret key $s_a$ which has a different value from the secret key k shared with the credit company b and which is known only by itself. Hereinafter, k is referred to as a first secret key and $s_a$ is referred to as a second secret key. Both k and $s_a$ are saved in the secret key saving portion 205. The value of the integer value g which is common in the system is also provided to the sales company A. Now, the third embodiment will be described below while incorporating the structure of the personal authentication system of FIG. 1.

Figure 16:
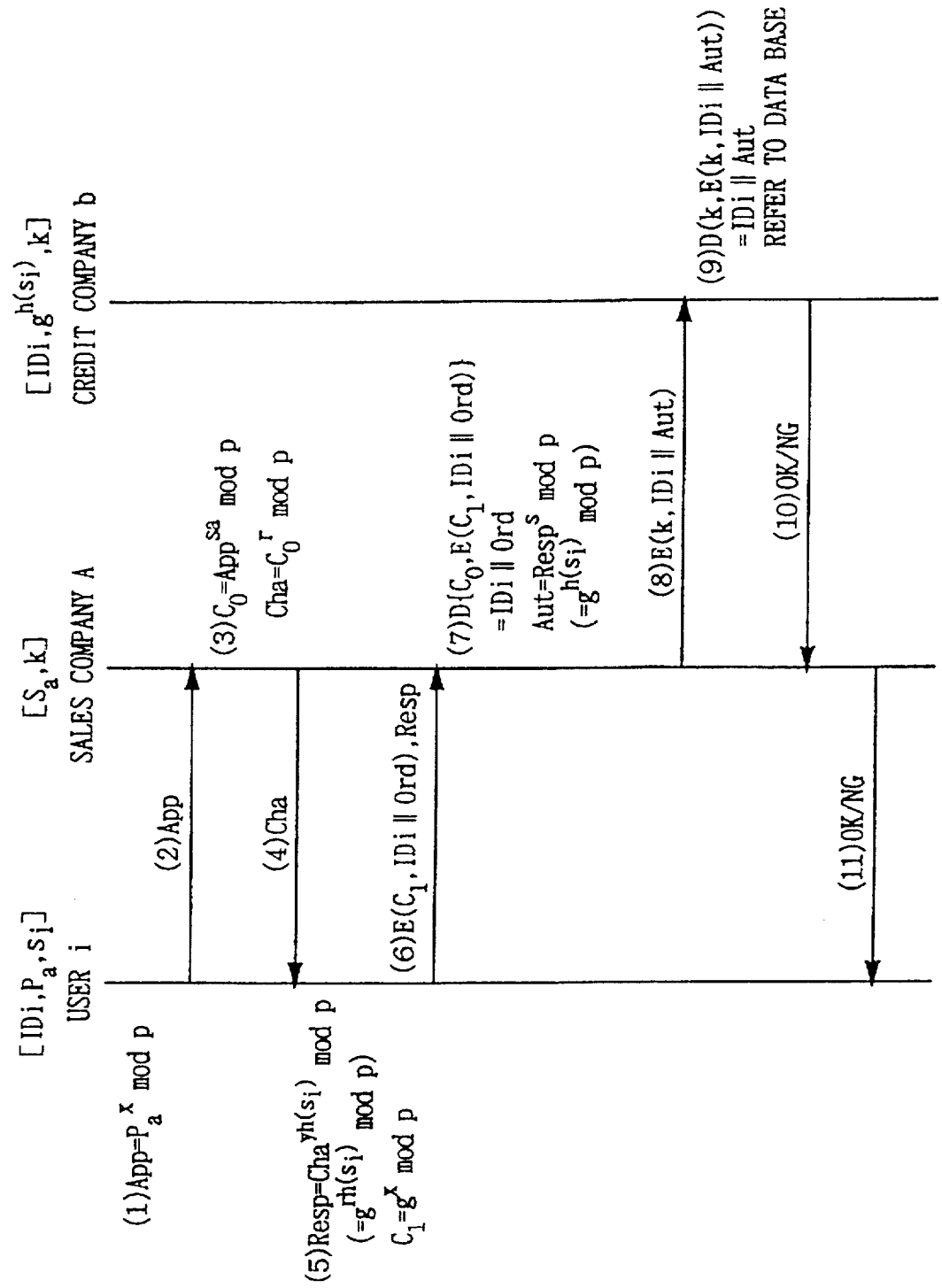
FIG. 16 is a sequence chart showing operations of a personal authentication system of a third embodiment.
Figure 17:
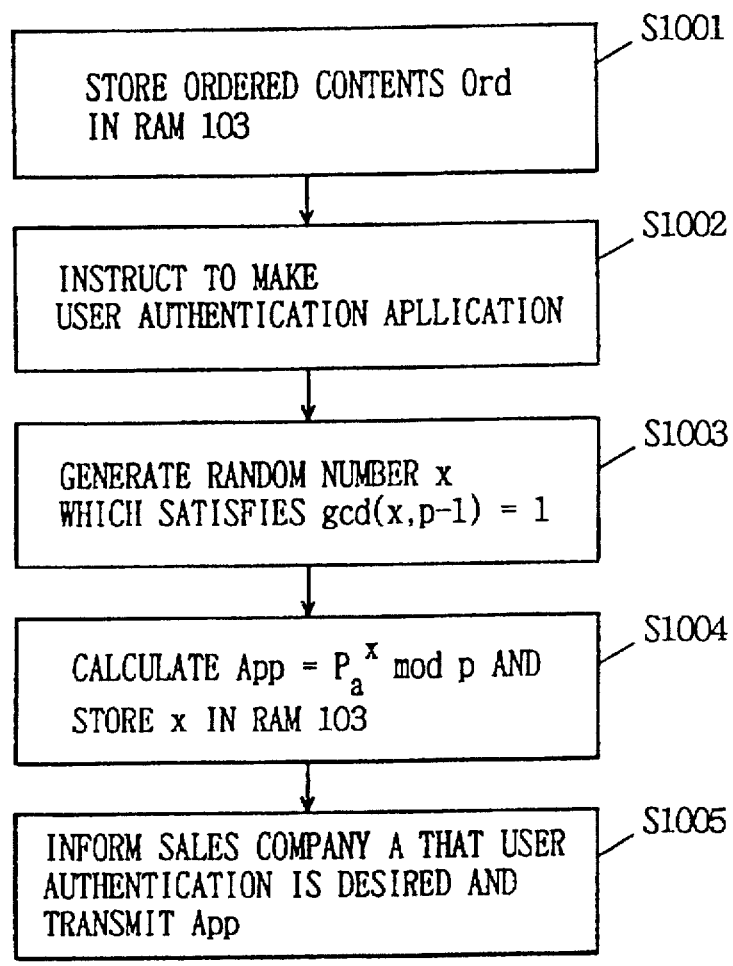
FIG. 17 is a flow chart showing operations for making an application for authentication of the authentication application device 10 of the third embodiment.
Figure 18:
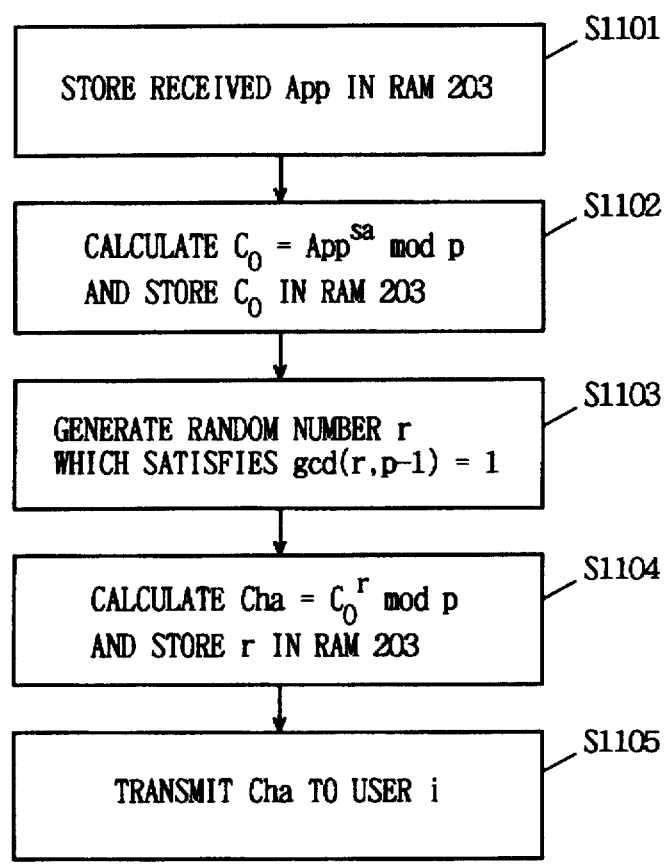
FIG. 18 is a flow chart showing operations for generating authentication challenge information of the authentication relay device 20 of the third embodiment.
Figure 19:
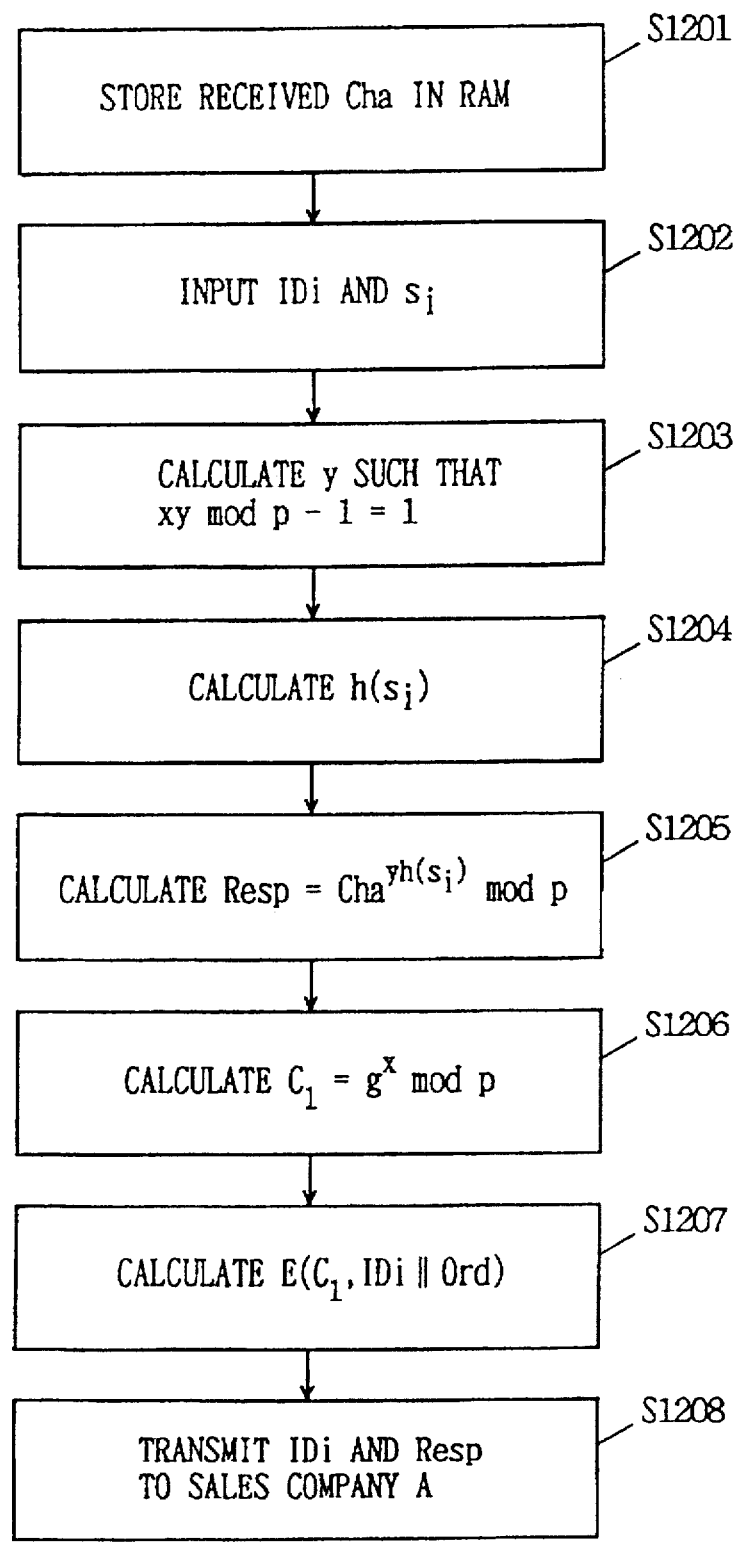
FIG. 19 is a flow chart showing operations for generating authentication response information of the authentication application device 10 of the third embodiment.
Figure 20:
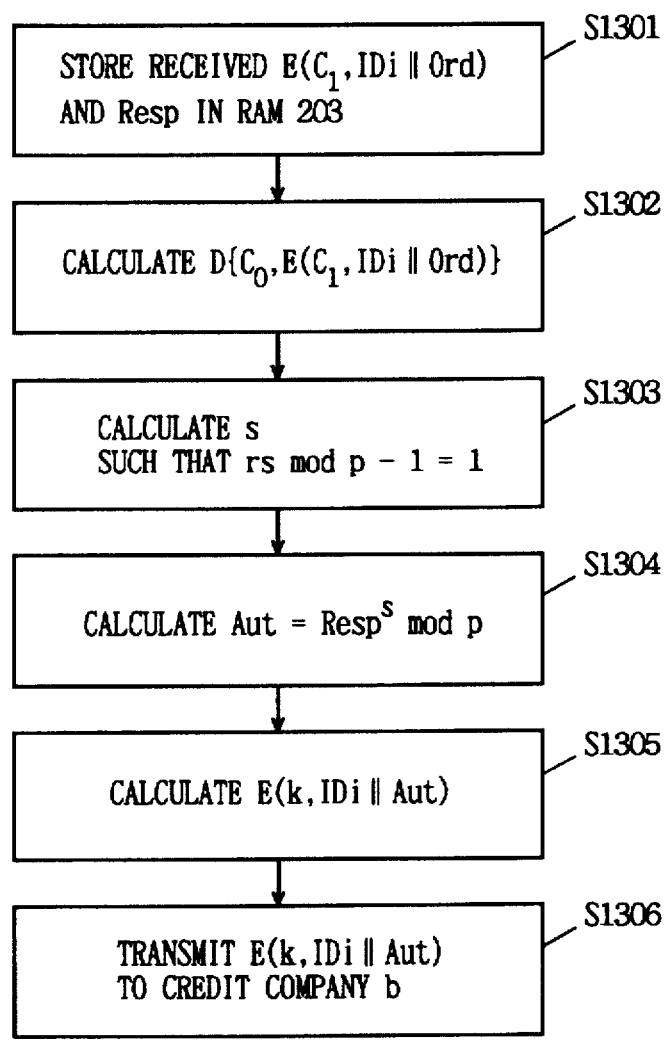
FIG. 20 is a flow chart showing operations for generating authentication reference information of the authentication relay device 20 of the third embodiment.
Figure 21:
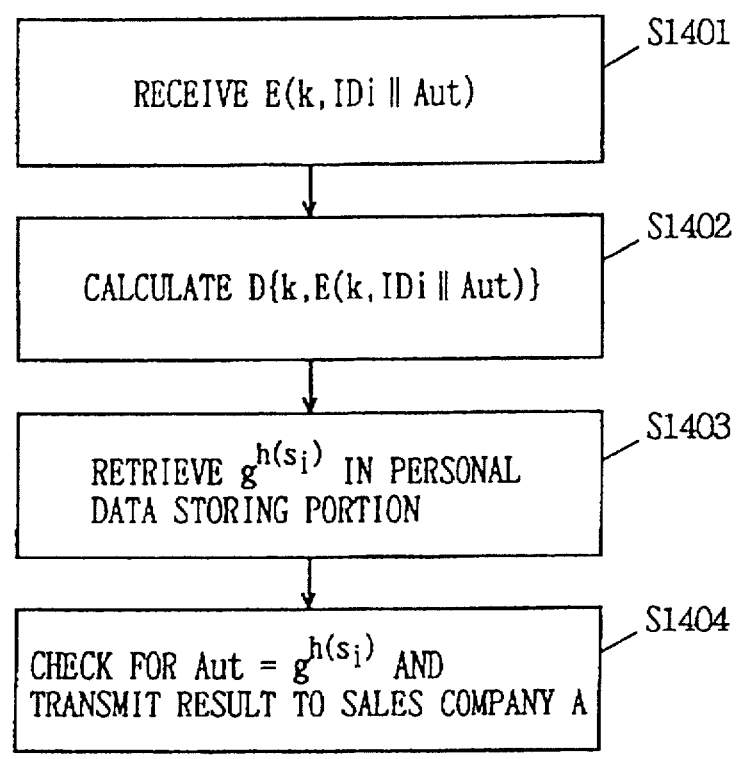
FIG. 21 is a flow chart showing operations for a user authentication check of the user authentication device 30 of the third embodiment.

FIG. 16 is a sequence chart showing operations of the personal authentication system of the third embodiment shown in FIG. 1. FIG. 17 is a flow chart showing operations for making an authentication application of the authentication application device 10 of FIG. 1. The operations correspond to (1) in FIG. 16. FIG. 18 is a flow chart showing operations for generating authentication challenge information of the authentication relay device 20 of FIG. 1. The operations correspond to (3) in FIG. 16. FIG. 19 is a flow chart showing operations of the authentication application device 10 of FIG. 1 for generating authentication response information. The operations correspond to (5) in FIG. 16. FIG. 20 is a flow chart showing operations of the authentication relay device 20 of FIG. 1 for generating authentication reference information. The operations correspond to (7) of FIG. 16. FIG. 21 is a flow chart showing operations of the user authentication device 30 of FIG. 1 for user authentication check. The operations correspond to (9) in FIG. 16. Now, referring to FIG. 16 through FIG. 21, operations in the third embodiment will be described.

First, the sales company A selects the second secret key sa of itself as an integer which satisfies the conditions:

$0 < s_a < p-1$ $\gcd(s_a, p-1) = 1$.

At this time, an integer u which satisfies the conditions:

$us_a \mod p-1 = 1$ $0 < u < p-1$ is calculated. Then, as $\gcd(s_a, p-1) = 1$, so that u necessarily exists. Here, the public key $P_a$ of the sales company A is calculated as $P_a = g^u \mod p$.

Each user acquires the public key $P_a$ of the sales company A which is a member of this system from a public data base, for example.

The processings shown below are all performed in the real-time processings. When a user i purchases goods of the sales company A in a mail-order system through a network and makes payment with a credit card, the sales company A authenticates the user i as being either a correct user or an incorrect user with a help of the credit company. In this embodiment, ordered contents Ord to be informed from the user i to the sales company A can be transmitted from the user i to the sales company A in the encrypted form.

The user i produces the ordered contents Ord for the sales company A and the control portion 101 stores the ordered contents Ord in the RAM 103. (Step S1001 in FIG. 17) The user i then instructs the authentication application device 10 to make a user authentication application. (Step S1002) The control portion 101 in the authentication application device 10 responds by generating a random-number parameter x using the random-number generator 106. (Step S1003) At this time the random-number parameter x is an integer which satisfies the conditions:

$0 < x < p-1$ $\gcd(x, p-1) = 1$.

Next, the control portion 101 computes authentication application information App as $App = P_a^x \mod p = g^{ux} \mod p$ using this random-number parameter x and then the control portion stores the random-number parameter x in the RAM 103. (Step S1004) Next, the control portion 101 informs the sales company A of the application for user authentication through the communication portion 107 by way of personal computer communication and transmits the authentication application information App. (Step S1005)

At the sales company A, the control portion 201 stores App received from the user i through the communication portion 206 in the RAM 203. (Step S1101 in FIG. 18) Next, the control portion 201 reads the second secret key $s_a$ stored in the secret key saving portion 205 and calculates common-key information $C_0$ on the sales company A side as $C_0 = App^{sa} \mod p = g^{usa} \mod p$ (Step S1102) and stores it in the RAM 203. At this time, as $us_a \mod p-1 = 1$ is satisfied, so that $C_0 = g^s \mod p$ because of the same reason as that described in Step S305 in the first embodiment. Next, the control portion 201 generates a random-number parameter r using the random-number generator 204. (Step S1103) At this time, the random-number parameter r is an integer which satisfies the conditions:

$0 < r < p-1$ $\gcd(r, p-1) = 1$.

Next, the control portion 201 fetches $C_0$ from the RAM 203, calculates authentication challenge information Cha using this random-number parameter r as $Cha = C_0^r \mod p = g^{sr} \mod p$ and stores the random-number parameter r in the RAM 203. (Step S1104) Next, the control portion 201 transmits the authentication challenge information Cha to the user i through the communication portion 206 by the personal computer communication. (Step S1105)

at the user i, the control portion 101 stores the authentication challenge information Cha received from the sales company A through the communication portion 107 into the RAM 103. (Step S1201 in FIG. 19) Next, the user i inputs his/her identification number IDi for credit membership and a password $S_i$. (Step S1202) Next, the control portion 101 reads the random-number parameter x stored in the RAM 103 and computes an integer y which satisfies the conditions:

$xy \mod p-1 = 1$ $0 < y < p-1$.

(Step S1203) Then, as $\gcd(x, p-1) = 1$ so such y necessarily exists.

Next, the control portion 101 substitutes the inputted password si into the hash function h to compute a hash value $h(s_i)$. (Step S1204) Then, the control portion 101 fetches the authentication challenge information Cha from the RAM 103 and computes authentication response information Resp for Cha as $Resp = Cha^{yh(si)} \mod p$
$= g^{sryh(si)} \mod p$.
(Step S1205) At this time,
$xy \mod p-1 = 1$ is satisfied, and because of the same reason described in Step S305 in the first embodiment, Resp = $g^{rh(si)}$ mod p. Next, the control portion 101 reads the random-number parameter x stored in the RAM 103 and calculates common-key information $C_1$ on the user i side as $C_1 = g^x \mod p$ (Step S1206) Then the control portion 101 reads the ordered contents Ord from the RAM 103 and, using the common-key information $C_1$ on the user i side as a key, it encrypts the ordered contents Ord and the identification number IDi of the user i with the secret-key encryption algorithm E as $E(C_1, IDi||Ord)$ (Step S1207) Then the control portion 101 transmits $E(C_1, IDi||Ord)$ and the authentication response information Resp to the sales company A through the communication portion 107 by the personal computer communication. (Step S1208)

At the sales company A, the control portion 201 stores $E(C_1, IDi||Ord)$ and the authentication response information Resp received from the user i through the communication portion 206 in the RAM 203. (Step S1301 in FIG. 20) Next, the control portion 201 reads the common-key information $C_0$ on the sales company A side stored in the RAM 203 and, using it as a key, decrypts $E(C_1, IDi||Ord)$ with the decryption algorithm D as $D \{C_0, E(C_1, IDi||Ord)\}$ (Step S1302) At this time, as $C_0 = C_{1,so}$ $D \{C_0, E(C_1 IDi||Ord)\} = IDi||Ord$ Next, the control portion 201 reads the random-number parameter r stored in the RAM 203 and calculates an integer s which satisfies the conditions:

$rs \mod p-1 = 1$ $0 < s < p-1$.

(Step S1303). At this time, as $\gcd(r, p-1) = 1$ so that s always exists.

Next, the control portion 201 fetches the authentication response information Resp from the RAM 203 and computes authentication reference information Aut as Aut = $Resp^s \mod p$
    = $g^{rh(si)s} \mod p$.
(Step S1304) At this time, as
  rs mod p-1 = 1
is satisfied, so
Aut = $g^{h(si)} \mod p$ because of the same reason described in the Step S305 of the first embodiment. Next, the control portion 201 fetches the identification number IDi of the user i stored in the RAM 203, reads the secret key k stored in the secret key saving portion 205 and, using them as keys, encrypts a connection of the identification number IDi and the authentication reference information Aut with the secret key encryption algorithm E as $E(k, IDi||Aut)$.

(Step S1305) The character "||" designates concatenation of information. The control portion 201 transmits $E(k, IDi||Aut)$ to the credit company b through the communication portion 206 by the personal computer communication. (Step S1306)

At the credit company b, the control portion 301 receives $E(k, IDi||Aut)$ transmitted from the sales company A through the communication portion 306. (Step S1401 in FIG. 21) Next, the control portion 301 reads the secret key k stored in the secret key saving portion 305 and, using it as a key, decrypts $E(k, IDi||Aut)$ with the decryption algorithm D as $D \{k, E(k, IDi||Aut)\} = IDi||Aut$ (Step S1402)

Next, the control portion 301 retrieves and reads the transformed secret information $\{g^{h(si)} \mod p\}$ stored in a set with the decrypted identification number IDi from the personal data storing portion 304. (Step S1403) Next, the control portion 301 checks if the decrypted authentication reference information Aut and the value of $\{g^{h(si)} \mod p\}$ read from the personal data storing portion 304 match. (Step S1404) Next, the control portion 301 transmits the result of the check to the sales company A through the communication portion 306. (Step S1404)

At the sales company A, the control portion 201 receives the result of check transmitted from the credit company b through the communication portion 206, and when the control portion 201 receives authentication by the credit company, the control portion 201 accepts ordered contents Ord transmitted from the user i, and when the control portion 201 can not receive authentication, the control portion 201 transmits to the user i that authentication was not approved.

At the user i, the control portion 101 receives information sent from the sales company A, and when the ordered contents are accepted, the control portion 101 displays that the order has been accepted in the display device 105. If the control portion 101 receives that the authentication is not approved, the control portion 101 displays the absence of authentication in the display device 105.

As has been described above, in the personal authentication system of the third embodiment, the credit company b can ascertain whether the user i is a right user i or not by only referring to the data base without releasing, to the sales company A, the password $s_i$ of the user i. This is due to the fact that it is extremely difficult, even if the value of g is known, to obtain $h^{(s_i)}$ from the information $\{g^{h(s_i)} \bmod p\}$ which the sales company A can know if the value of p is large (which is a value of about 512 bits in the above-described third embodiment.) Furthermore, in the third embodiment, the user i and the sales company A, which do not have a common key, generates a common key on the basis of the random-number parameter x, so that the ordered contents Ord and the identification number IDi can be transmitted, after being encrypted, from the user i to the sales company A using this common key. Accordingly, others can not determine the ordered contents Ord and the identification number IDi. Or, one of the ordered contents Ord and the identification number IDi may be transmitted after being encrypted.

The case where the password $s_i$ of the user i is a small number can be considered in the same way as the first embodiment.

When an IC card is provided to an authentication application device at each user to control a password of the user i with the IC card, then the value of $s_i$ does not have to be a small value of about four decimal digits, which removes the necessity of use of the function h. In this case, however, the use of the hash function h will further improve the security.

In the same way as the first embodiment, if someone taps the line of the personal computer communication between the user i and the sales company A, the value of $\{g^{h(s_i)} \bmod p\}$ can not be determined. This is due to the fact that, transmitted on the line of the personal computer communication, is information of App=$g^{ux}$ mod p Cha=$g^{xr}$ mod p Resp=$g^{rh(s_i)}$ mod p and finding the value of the $\{g^{h(s_i)} \bmod p\}$ from Resp requires the value of the random-number parameter r. The "discrete logarithm problem" has to be solved to obtain the value of the random-number parameter r from App, Cha, which is actually impossible.

Furthermore, when the identification number IDi and the authentication reference information Aut are transmitted between the sales company A and the credit company b, they are encrypted with the secret key k which is shared by the two companies such that intercepting them is useless.

This way, in the third embodiment, nobody except the user i can determine the password $s_i$ of the user i, the operations in the embodiment can authenticate the user i as a correct one, and the ordered contents Ord and the identification number IDi of the user i are transmitted after being encrypted so that third parties can not determine them.

Although the value of g is a value common in the personal authentication system in the third embodiment, the value of g may be varied for every user. In this case, the user i determines the value of g and computes $\{g^{h(s_i)} \bmod p\}$, and informs the credit company b of it. In this case, as the value of g itself is secret, the security is further improved. Similarly, the hash function h may be varied for every users, which also further improves the security.

Although the bidirectional communication between the user i, the sales company A and the credit company b is made using the personal computer communication in the third embodiment, the communication can be made to produce the same effects by using the digital CATV network, B-ISDN, etc. which can implement bidirectional communication.

The third embodiment described above is an improvement of the first embodiment described above, in which the user i and the sales company A can make encryption communication while having a common key, and the same encryption communication can also be applied to the second embodiment. Such an embodiment will be described below as a fourth embodiment.

(4) Fourth Embodiment

The fourth embodiment of the present invention is a personal authentication system using the same structure as that of the personal authentication system described in the first embodiment. That is to say, it can be implemented with the same structure as that in the first embodiment, but when it is confirmed if the user i is a right user or not, a common key can be generated between the user i and the sales company A, which only the two know, and the user i and the sales company A can make cryptographic communication, in the same way as the third embodiment. The sales company A determines a secret key $s_a$ which is known only to itself and has a value different from the secret key k shared with the credit company b. Hereinafter, k is referred to as a first secret key and $s_a$ is referred to as a second secret key. Both k and $s_a$ are saved in the secret key saving portion 205. The value of the integer value g which is common in the system is also provided to the sales company A. Furthermore, the user i is provided with a public key $P_a$ of the sales company A, which is stored in the ROM 102. As has been described above, this public key $P_a$ is managed in a publication such as a telephone book or a public data base, which can be easily obtained by anybody.

Figure 22:
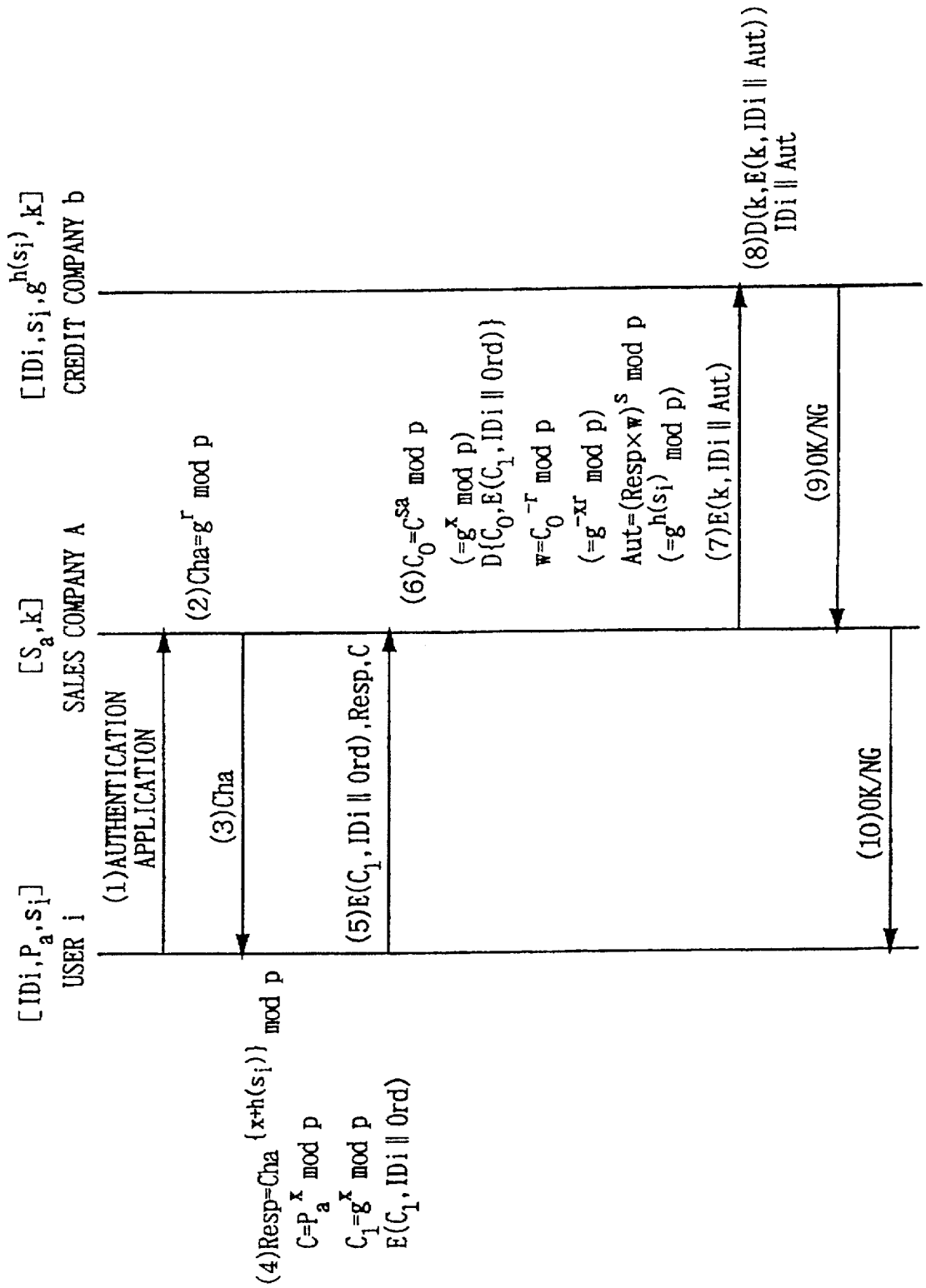
FIG. 22 is a sequence chart showing operations of a personal authentication system of a fourth embodiment.
Figure 23:
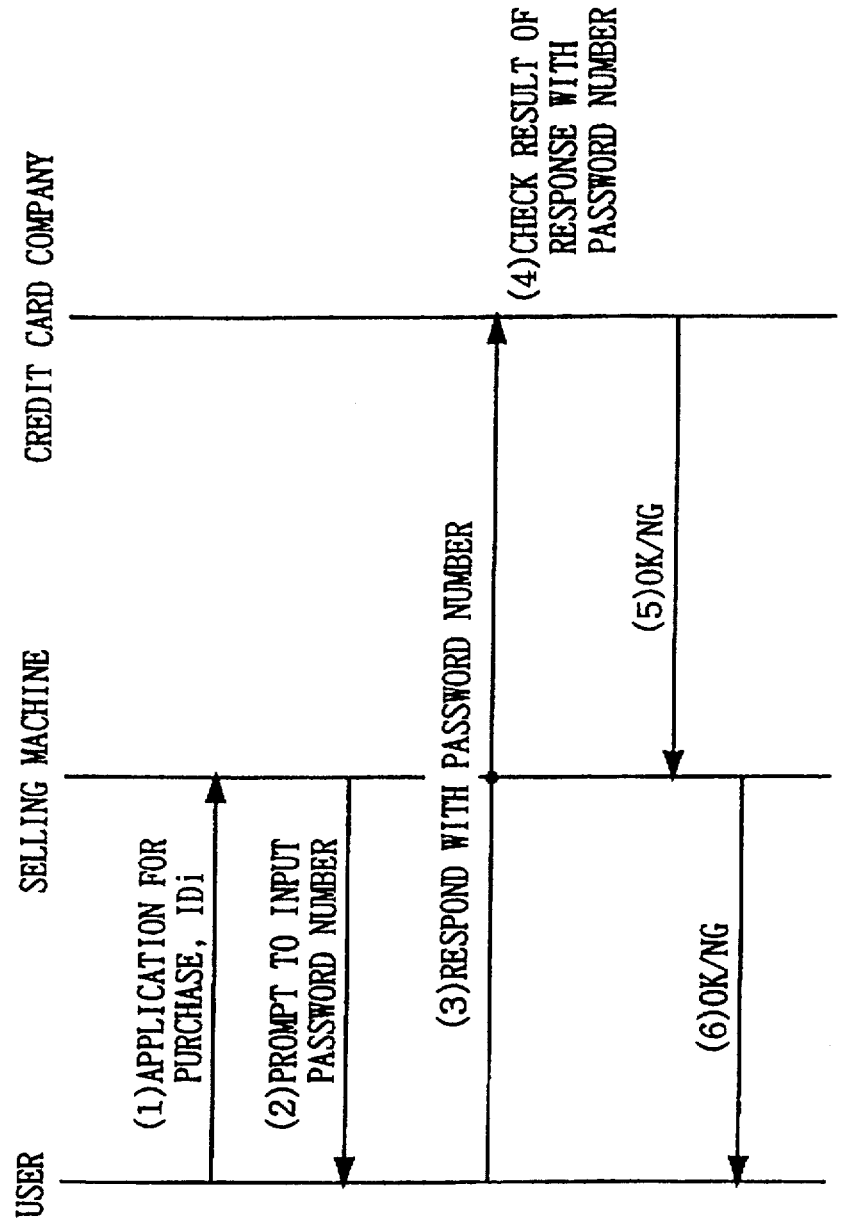
FIG. 23 is a sequence chart showing operations of the second conventional example.

FIG. 22 is a sequence chart showing the operation of the entire personal authentication system of the fourth embodiment. Now, the fourth embodiment will be described referring to FIG. 22 while incorporating the structure of the personal authentication system of FIG. 1.

First, the sales company A selects the second secret key $s_a$ of itself as an integer which satisfies the conditions:

$0 < s_a < p-1$ gcd $(s_a, p-1)=1$.

At this time, an integer u which satisfies the conditions:

$us_a$ mod $p-1=1$ $0 < u < p-1$ is calculated. Then, as gcd $(s_a, p-1)=1$, so that u necessarily exists. Here, the public key $P_a$ of the sales company A is calculated as $P_a = g^u$ mod p.

Each user acquires the public key $P_a$ of the sales company A which is a member of this system from a public data base, for example.

When the user i buys goods of the sales company A in a mail-order system through network and makes payment with a credit card, the user i must receive user authentication by the credit company before making an order. In this embodiment, the user i can encrypt ordered contents Ord instructed to the sales company A, and transmit the same to the sales company A.

First, the user i creates the ordered contents Ord for the sales company A and the control portion 101 stores the ordered contents Ord in the RAM 103. Then, the user i instructs the authentication application device 10 to make an application for user authentication. The control portion 101 responds by sending the application for user authentication to the sales company A through the communication portion 107 by the personal computer communication. (The procedure (1) in FIG. 22)

At the sales company A, a random-number parameter r is generated by using the random-number generator 204. At this time, the random-number parameter r is an integer which satisfies the conditions:

$0 < r < p-1$ $\gcd(r, p-1) = 1$.

Next, the control portion 201 calculates authentication challenge information Cha using this random-number parameter r as $Cha = g^r \bmod p$ and stores the random-number parameter r in the RAM 203. (The procedure (2) in FIG. 22) Next, the control portion 201 transmits the authentication challenge information Cha to the user i through the communication portion 206 by the personal computer communication. (The procedure (3) in FIG. 22)

At the user i, the control portion 101 stores the authentication challenge information Cha received from the sales company A through the communication portion 107 in the RAM 103. Next, the user i inputs an identification number IDi for his/her credit membership and a password si in the control portion 101 using the input operation device 104. In response, the control portion 101 generates a random-number parameter x using the random-number generator 106. At this time, the random-number parameter x is an integer which satisfies the conditions:

$0 < x < p-1$ $\gcd(x, p-1) = 1$.

Next, the control portion 101 fetches the authentication challenge information Cha from the RAM 103 and calculates, using the random-number parameter x, first authentication response information Resp, second authentication response information C and common-key information $C_1$ on the user i side as $$Resp = Cha^{\{x+h(si)\}} \bmod p$$
$$C = P_a^x \bmod p$$
$$\phantom{C} = g^{ax} \bmod p$$
$$C_1 = g^x \bmod p$$

(The procedure (4) in FIG. 22) Then, the control portion 101 reads the ordered contents Ord from the RAM 103 and encrypts the ordered contents Ord and the identification number IDi of the user i using the common-key information $C_1$ on the user i side as a key with the secret-key encryption algorithm E as $E(C_1, IDi\|Ord)$ (The procedure (4) in FIG. 22) Then, the control portion 101 transmits $E(C_1, IDi\|Ord)$, the authentication response information Resp and the second authentication response information C through the communication portion 107 to the sales company A by the personal computer communication. (The procedure (5) in FIG. 22)

At the sales company A, the control portion 201 stores the $E(C_1, IDi\|Ord)$, the authentication response information Resp and the second authentication response information C received from the user i through the communication portion 206 in the RAM 203 and performs the operation of the procedure (6) in FIG. 22 shown below.

First, the control portion 201 reads the second secret key $S_a$ stored in the secret key saving portion 205 and calculates common-key information $C_0$ on the sales company A side as $C_0 = C^{sa} \bmod p = g^x \bmod p \ (= C_1)$ and stores it in the RAM 203. (The procedure (6) in FIG. 22) Next, the control portion 201 decrypts $E(C_1, IDi\|Ord)$ with the decryption algorithm D using as a key the common-key information $C_0$ on the sales company A side obtained by calculation as $D \{C_0, E(C_1, IDi\|Ord)\}$.

At this time, as $C_0 = C_1$, so $D \{C_0, E(C_1, IDi\|Ord)\} = IDi\|Ord$.

Next, the control portion 201 reads the random-number parameter r stored in the RAM 203 and calculates an integer s ($0 < s < p-1$) which satisfies $rs \bmod p-1 = 1$.

At this time, as $\gcd(r, p-1) = 1$, so that s necessarily exists. Then the control portion 201 reads the common-key information $C_0$ from the RAM 203 and calculates an integer z ($0 < z < p$) which satisfies $C_0 z \bmod p = 1$.

At this time, as $1 < g < p$ $C_0 = g^x \bmod p$ and, $\gcd(C_0, p) = 1$, so that z necessarily exists. Then, the control portion 201 also calculates w as $w = z^r \bmod p$.

At this time, as z is regarded as $z = C_0^{-1} \bmod p$ so w is regarded as $w = g^{-xr} \bmod p$.

Next, the control portion 201 calculates the authentication reference information Aut as $Aut = (Resp \times w)^s \bmod p$
$\phantom{Aut} = [g^{r\{x+h(si)\}-xr}]^s \bmod p$
$\phantom{Aut} = \{g^{rh(si)}\}^s \bmod p$.

At this time, as $rs \bmod p-1 = 1$ is satisfied, so $Aut = g^{h(si)} \bmod p$ because of the same reason as described in the Step S305 in the first embodiment.

Next, the control portion 201 takes out the identification number IDi stored in the RAM 203, reads the secret key k held in the secret key saving portion 205, and using it as a key, encrypts a connection of the identification number IDi and the authentication reference information Aut with the secret key encryption algorithm E as $E(k, IDi\|Aut)$.

Then, the control portion 201 transmits $E(k, IDi\|Aut)$ to the credit company b through the communication portion 206 by the personal computer communication. (The procedure (7) in FIG. 22)

At the credit company b, receiving the $E(k, IDi\|Aut)$ transmitted from the sales company A through the communication portion 306, the control portion 301 reads the secret key k held in the secret key saving portion 305, and using it as a key, decrypts it with the decryption algorithm D as $$D \{k, E(k, IDi\|Aut)\} = IDi\|Aut$$

(The procedure (8) in FIG. 22)

Next, the control portion 301 retrieves and reads the transformed secret information $\{g^{h(s_i)} \bmod p\}$ recorded in a set with the decrypted identification number IDi from the personal data storing portion 304. Next, the control portion 301 checks if the decrypted authentication reference information Aut and the value of the transformed secret information $\{g^{h(s_i)} \bmod p\}$ read from the personal data storing portion 304 match. Next, the control portion 301 transmits the result of the check to the sales company A through the communication portion 306. (The procedure (9) in FIG. 22)

At the sales company A, the control portion 201 receives the check result transmitted from the credit company b through the communication portion 206, and when the control portion 201 receives authentication by the credit company, the control portion 201 accepts the ordered contents Ord transmitted from the user i, and when t can not receive authentication, transmits to the user i that the authentication was not approved. ((10) in FIG. 22)

At the user i, the control portion 101 receives the information transmitted from the sales company A, and when the ordered contents are accepted, displays that the order has been accepted in the display device 105. If the authentication was not approved, it displays in the display device 105 to show that the authentication was not approved.

In the above-described fourth embodiment, in the same way as the second embodiment, the credit company b can confirm whether the user i is a correct user or not only by referring to the data base without releasing, to the sales company A, the password $s_i$ of the user i. Furthermore, in the fourth embodiment, the user i and the sales company A having no common key in advance can generate a common key on the basis of the random-number parameter x and the ordered contents Ord and the identification number IDi, encrypted using this common key, can be transmitted from the user i to the sales company A. Accordingly, no other parties can determine the ordered contents Ord and the identification number IDi. Or, one of the ordered contents Ord and the identification number IDi may be transmitted being encrypted.

The case where the password $s_i$ of the user i is a small number can be considered in the same way as the first embodiment.

When an IC card is provided to an authentication application device at each user to control a password of the user i with the IC card, then the value of $s_i$ does not have to be a small value of about four decimal digits, which removes the necessity of use of the function h. In this case, however, the use of the hush function h will further improve the security.

Also, as stated in the first embodiment, if someone taps the line of the personal computer communication between the user i and the sales company A, the value of $\{g^{h(s_i)} \bmod p\}$ can not be determined. This is due to the fact that transmitted on the line of the personal computer communication are information of $$Cha = g^r \bmod p$$
$$Resp = g^{r\{x + h(s_i)\}} \bmod p$$
$$C = g^{ux} \bmod p$$

and finding the value of the $\{g^{h(s_i)} \bmod p\}$ from Resp requires the values of the random-number parameters r, x. The "discrete logarithm problem" has to be solved to obtain the values of the random-number parameters r and x from Cha, C, which is actually impossible.

Furthermore, when the identification number IDi and the authentication reference information Aut are transmitted between the sales company A and the credit company b, they are encrypted with the secret key k which is shared by the two companies such that intercepting them is useless.

As has been described above, in the fourth embodiment, nobody except the user i can determine the password of the user i and operations in the embodiment can verifies the user i as a right user, and furthermore, as the ordered contents Ord and the identification number IDi of the user i are transmitted in the encrypted form, third parties can not determine them.

Although the value of g is a value common in the personal authentication system in the fourth embodiment, the value of g may be varied for every user. In this case, the user i determines the value of g and computes $\{g^{h(s_i)} \bmod p\}$, and informs the credit company b of it. In this case, as the value of g itself is secret, the security is further improved. Similarly, the hash function h may be varied for every users, which also further improves the security.

Although the bidirectional communication between the user i, the sales company A and the credit company b is made using the personal computer communication in the fourth embodiment, the communication can be made to produce the same effects by using the digital CATV network, B-ISDN, etc. which can implement bidirectional communication.

While the invention has been described in detail, the foregoing description is in all aspects illustrative and not restrictive. It is understood that numerous other modifications and variations can be devised without departing from the scope of the invention.

What is claimed is:

1. A method in which first and second authenticating stations cooperatively authenticate information related to a prover transmitted from a prover station, said method comprising:

said first authenticating station storing, in a data base, a pair of identification information of said prover and transformed secret information, wherein said transformed secret information is obtained by applying a first one-way transformation to secret information corresponding to said identification information;

wherein when said prover requests authentication, said prover station generates a first variable parameters, applies a second one-way transformation to said first variable parameter to generate authentication application information dependent on said first variable parameters, and transmits said authentication application information to said second authenticating station;

wherein said second authenticating station, upon receiving said authentication application information, generates a second variable parameters, applies a third one-way transformation to said second variable parameter and the received said authentication application information to generate authentication challenge information dependent on said first and second variable parameters, and transmits said authentication challenge information to said prover station;

wherein said prover station applies a fourth one-way transformation to the received said authentication challenge information, said first variable parameter, and said secret information unique to said prover to be authenticated, to generate authentication response information independent of said first variable parameter, and transmits said authentication response information to said second authenticating station with said identification information of said prover;

wherein said second authenticating station applies a fifth one-way transformation to the received said authentication response information and said second variable parameter to generate authentication reference information independent of said second variable parameter, and transmits said authentication reference information to said first authenticating station with the received said identification information of said prover;

wherein said first authenticating station retrieves said transformed secret information, corresponding to the received said identification information, from said data base, checks if the retrieved said transformed secret information matches with the received said authentication reference information, and transmits to said second authenticating station approval information indicating that said prover is a correct prover when they match, and transmits disapproval information indicating that said prover is not authenticated as a correct prover when they do not match; and wherein said second authenticating station authenticates said prover according to the received approval or disapproval information.

2. The personal authentication method according to claim 1, wherein said first and second variable parameters are random-number parameters.

3. The personal authentication method according to claim 1 or 2, wherein if said secret information corresponding to said identification information of said prover is a positive integer $s_i$, p is a prime number, and g is an integer value which satisfies an inequality $1<g<p$;

said transformed secret information is a remainder value obtained when $g^{s_i}$ is divided by the prime number p.

4. The personal authentication method according to claim 3, wherein said integer value g is varied for each prover.

5. The personal authentication method according to claim 1 or 2, wherein if said secret information corresponding to said identification information of said prover is a positive integer $s_i$, p is a prime number, g is an integer value which satisfies an inequality $1<g<p$, and h is a hash function;

said transformed secret information is a remainder value from a division of $g^{h(1s_i1s_i)}$ by the prime number p.

6. The personal authentication method according to claim 5, wherein if said first variable parameter x is an integer value which satisfies:

$0<x<p-1$ $\gcd(x, p-1)=1$;

where $\gcd(\alpha, \beta)$ indicates the greatest common divisor of $\alpha$ and $\beta$;

said second variable parameter r is an integer value which satisfies:

$0<r<p-1$ $\gcd(r, p-1)=1$;

y is an integer value ($0<y<p-1$) which satisfies:

$xy \bmod p-1=1$;

where $\alpha \bmod \beta$ indicates a remainder value when $\alpha$ is divided by $\beta$;

s is an integer value ($0<s<p-1$) which satisfies:

$rs \bmod p-1=1$; and said authentication application information App, said authentication challenge information Cha, said authentication response information Resp, and said authentication reference information Aut are obtained respectively as:

App=$g^x$ mod p

Cha=App$^r$ mod p=$g^{xr}$ mod p

Resp=Cha$^{yh(s_i)}$ mod p=$g^{rh(s_i)}$ mod p

Aut=Resp$^s$ mod p=$g^{h(s_i)}$=$g^{h(s_i)}$ mod p.

7. The personal authentication method according to claim 6, wherein said hash function h is varied for each prover.

8. The personal authentication method according to claim 6, wherein said integer value g is varied for each prover.

9. The personal authentication method according to claim 5, wherein said hash function h is varied for each prover.

10. The personal authentication method according to claim 5, wherein said integer value g is varied for each prover.

11. A method in which first and second authenticating stations cooperatively authenticate information related to a prover transmitted from a prover station, said method comprising:

said first authenticating station storing, in a data base, a pair of identification information of said prover and transformed secret information, wherein said transformed secret information is obtained by applying a first one-way transformation to secret information corresponding to said identification information;

wherein when said prover station requests an authentication application, said second authenticating station generates a first variable parameter, applies a second one-way transformation to said first variable parameter to generate authentication challenge information dependent on said first variable parameter, and transmits said authentication challenge information to said prover station;

wherein upon receiving said authentication challenge information, said prover station generates a second variable parameter, applies a third one-way transformation to said second variable parameter, said authentication challenge information and said secret information unique to said prover to be authenticated, to generate first authentication response information dependent on said secret information and said first and second variable parameters and said second authentication response information dependent on said second variable parameter, and transmits said first and second authentication response information to said second authenticating station with said identification information of said prover;

wherein said second authenticating station applies a fourth one-way transformation to said first variable parameter and the received said first and second authentication response information to generate authentication reference information independent of said first and second variable parameters, and transmits said authentication reference information to said first authenticating station together with the received said identification information of the prover;

wherein said first authenticating station retrieves said transformed secret information, corresponding to the received said identification information of the prover, from said data base, checks if the retrieved said transformed secret information matches with the received said authentication reference information, and when they match, transmits to the second authenticating station approval information indicating that said prover is a correct prover, and when they do not match, transmits disapproval information indicating that said prover is not a correct prover; and wherein said second authenticating station authenticates said prover according to the received said approval or disapproval information.

12. The personal authentication method according to claim 11, wherein said first and second variable parameters are random-number parameters.

13. The personal authentication method according to claim 11 or 12, wherein if said secret information corresponding to said identification information of said prover is a positive integer $s_i$, p is a prime number, and g is an integer value which satisfies an inequality 1<g<p;

said transformed secret information is a remainder value obtained when $g^{s_i}$ is divided by the prime number p.

14. The personal authentication method according to claim 13, wherein said integer value g is varied for each prover.

15. The personal authentication method according to claim 11 or 12, wherein if said secret information corresponding to said identification information of said prover is a positive integer $s_i$, p is a prime number, g is an integer value which satisfies an inequality 1<g<p, and h is a hash function;

said transformed secret information is a remainder value obtained when $g^{h(s_i)}$ is divided by the prime number p.

16. The personal authentication method according to claim 15, wherein if said first variable parameter r is an integer value which satisfies:

0<r<p−1
gcd(r, p−1)=1;
where gcd ($\alpha$, $\beta$) indicates the greatest common divisor of $\alpha$ and $\beta$;

said second variable parameter x is an integer value which satisfies:

0<x<p−1
gcd (r, p−1)=1;
said second authentication response information C is a value obtained by:

C=$g^x$ mod p
where $\alpha$ mod $\beta$ indicates a remainder value when $\alpha$ is divided by $\beta$;

z is an integer value (0<z<p) which satisfies:
Cz mod p=1;
w is a value obtained by;
w=$z^r$ mod p=$g^{-xr}$ mod p, and
s is an integer (0<s<p−1) which satisfies:
rs mod p−1=1; and
said authentication challenge information Cha, said first authentication response information Resp, and said authentication reference information Aut are respectively obtained by:

Cha=$g^r$ mod p
Resp=$C^{Cha+h(s_i)}$ mod p=$g^{r\{x+h(s_i)\}}$ mod p
Aut=(Resp x w)$^s$ mod p=$g^{h(s_i)}$ mod p.

17. The personal authentication method according to claim 16, wherein said integer value g is varied for each prover.

18. The personal authentication method according to claim 16, wherein said hash function h is varied for each prover.

19. The personal authentication method according to claim 15, wherein said hash function h is varied for each prover.

20. The personal authentication method according to claim 15, wherein said integer value g is varied for each prover.

21. A method in which first and second authenticating stations cooperatively authenticate information related to a prover transmitted from a prover station, said method comprising:

said first authenticating station storing, in a data base, a pair of identification information of said prover and transformed secret information, wherein said transformed secret information is obtained by applying a first one-way transformation to secret information corresponding to said identification information;

wherein when said prover station requests an authentication application, said second authenticating station generates a variable parameter, applies a second one-way transformation to said variable parameter to generate authentication challenge information dependent on said variable parameter, and transmits said authentication challenge information to said prover station;

wherein said prover station applies a third one-way transformation to the received said authentication challenge information and said secret information unique to said prover to be authenticated to generate authentication response information and transmits said authentication response information to said second authenticating station with said identification information of said prover.

wherein said second authenticating station applies a fourth one-way transformation to said variable parameter and the received said authentication response information to generate authentication reference information independent of said variable parameter and transmits said authentication reference information to said first authenticating station with the received said identification information of said prover;

wherein said first authenticating station retrieves said transformed secret information, corresponding to the received said identification information of said prover, from said data base, checks if the retrieved said transformed secret information matches with the received said authentication reference information and transmits approval information, indicating that said prover is a correct prover, to said second authenticating station when they match, and transmits disapproval information indicating that said prover is not a correct prover when they do not match; and wherein said second authenticating station authenticates said prover according to the received said approval or disapproval information.

22. The personal authentication method according to claim 21, wherein said variable parameter is a random-number parameter.

23. The personal authentication method according to claim 21 or 22, wherein if said secret information corresponding to the identification information of said prover is a positive integer $s_i$, p is a prime number, and g is an integer value which satisfies an inequality 1<g<p;

said transformed secret information is a remainder value obtained when $g^{s_i}$ is divided by the prime number p.

24. The personal authentication method according to claim 23, wherein said integer value g is varied for each prover.

25. The personal authentication method according to claim 21 or 22, wherein if said secret information corresponding to said identification information of said prover is a positive integer $s_i$, p is a prime number, g is an integer value which satisfies an inequality 1<g<p, and h is a hash function;

said transformed secret information is a remainder value from a division of $g^{h(s_i)}$ by the prime number p.

26. The personal authentication method according to claim 25, wherein said hash function h is varied for each prover.

27. The personal authentication method according to claim 26, wherein said integer value g is varied for each prover.

28. The personal authentication method according to claim 25, wherein said integer value g is varied for each prover.

29. The personal authentication method according to claim 28, wherein said hash function h is varied for each prover.

30. A method in which first and second authenticating stations cooperatively authenticate information related to a prover transmitted from a prover station, said method comprising:

said first authenticating station storing, in a data base, a pair of identification information of said prover and transformed secret information, wherein said transformed secret information is obtained by applying a first one-way transformation to secret information corresponding to said identification information;

wherein when said prover requests authentication, said prover station generates a first variable parameter, applies a second one-way transformation to said first variable parameter and public information about said second authenticating station to produce authentication application information dependent on said first variable parameter and said public information, and transmits said authentication application information to said second authenticating station;

wherein upon receiving said authentication application information, said second authenticating station applies a third one-way transformation to said authentication application information and said secret information unique to itself to generate first common-key information independent of said public information, and generates a second variable parameter and applies a fourth one-way transformation to said second variable parameter and said first common-key information to generate authentication challenge information dependent on said first and second variable parameters, and transmits said authentication challenge information to said prover station;

wherein said prover station applies a fifth one-way transformation to the received said authentication challenge information, said first variable parameter and said secret information unique to the prover to be authenticated to generate authentication response information independent of said first variable parameter, and applies a sixth one-way transformation to said first variable parameter to generate second common-key information, and encrypts said identification information of said prover, using said second common-key information, and transmits the encrypted said identification information to said second authenticating station together with said authentication response information;

wherein said second authenticating station decrypts, using said first common-key information, the encrypted said identification information of the prover and applies a seventh one-way transformation to the received said authentication response information and said second variable parameter to generate authentication reference information independent of said second variable parameter and transmits said authentication reference information to said first authenticating station together with the decrypted said identification information of said prover;

wherein said first authenticating station retrieves said transformed secret information, corresponding to the received said identification information, from said data base, checks if the retrieved said transformed secret information matches with the received said authentication reference information, and when they match, transmits approval information, indicating that said prover is a correct prover, to said second authenticating station, and when they do not match, transmits disapproval information indicating that said prover is not authenticated as a correct prover; and wherein said second authenticating station authenticates said prover according to the received said approval or disapproval information.

31. The personal authentication method according to claim 30, wherein said first and second variable parameters are random-number parameters.

32. The personal authentication method according to claim 30 or 31, wherein if said secret information corresponding to the identification information of said prover is a positive integer $s_i$, p is a prime number, and g is an integer value which satisfies an inequality $1<g<p$;

said transformed secret information is a remainder value obtained when $g^{s_i}$ is divided by the prime number p.

33. The personal authentication method according to claim 32, wherein said integer value g is varied for each prover.

34. The personal authentication method according to claim 30 or 31, wherein if said secret information corresponding to said identification information of said prover is a positive integer $s_i$, p is a prime number, g is an integer value which satisfies an inequality $1<g<p$, and h is a hash function;

said transformed secret information is a remainder value obtained when $g^{h(s_i)}$ is divided by the prime number p.

35. The personal authentication method according to claim 34, wherein if said first variable parameter x is an integer value which satisfies:

$0<x<p-1$ $\gcd(x, p-1)=1$;

where $\gcd(\alpha, \beta)$ indicates the greatest common divisor of $\alpha$ and $\beta$;

said second variable parameter r is an integer value which satisfies:

$0<r<p-1$ $\gcd(r, p-1)=1$;

y is an integer value ($0<y<p-1$) which satisfies:

$xy \bmod p-1=1$ where $\alpha \bmod \beta$ indicates a remainder value when $\alpha$ is divided by $\beta$;

s is an integer value ($0<s<p-1$) which satisfies:

$rs \bmod p-1=1$;

said secret information $s_a$ unique to said second authenticating station is an integer which satisfies:

$0<s_a<p-1$ $\gcd(s_a, p-1)=1$;

u is an integer value ($0<u<p-1$) which satisfies:

$us_a \bmod p-1=1$; and said public information $P_a$ about said second authenticating station is a value represented as:

$P_a=g^u \bmod p$; and said authentication application information App, said first common-key information $C_0$, said authentication challenge information Cha, said authentication response information Resp, said second common-key information $C_1$ and said authentication reference information Aut are respectively obtained by:

$App=P_a^x \bmod p=g^{ux} \bmod p$ $C_0=App^{sa} \bmod p=g^x \bmod p$ $Cha = C_0^r \bmod p = g^{xr} \bmod p$
$Resp = Cha^{yh(s_i)} \bmod p = g^{rh(s_i)} \bmod p$
$C_1 = g^x \bmod p$
$Aut = Resp^s \bmod p = g^{h(s_i)} \bmod p.$ 36. The personal authentication method according to claim 35, wherein said integer value g is varied for each prover.

37. The personal authentication method according to claim 35, wherein said hash function h is varied for each prover.

38. The personal authentication method according to claim 34, wherein said hash function h is varied for each prover.

39. The personal authentication method according to claim 34, wherein said integer value g is varied for each prover.

40. The personal authentication method according to claim 30, wherein said prover station encrypts, using said second common-key information, prescribed information in addition to said identification information of said prover and transmits said prescribed information to said second authenticating station together with said authentication response information.

41. The personal authentication method according to claim 40, wherein said prescribed information is order information of goods.

42. A method in which first and second authenticating stations cooperatively authenticate information related to a prover transmitted from a prover station, said method comprising:

said first authenticating station storing, in a data base, a pair of identification information of said prover and transformed secret information, wherein said transformed secret information is obtained by applying a first one-way transformation to secret information corresponding to the identification information;

wherein when said prover requests authentication, said prover station generates a first variable parameter and applies a second one-way transformation to said first variable parameter and public information about said second authenticating station to produce authentication application information dependent on said first variable parameter and said public information, and transmits said authentication application information to said second authenticating station;

wherein upon receiving said authentication application information, said second authenticating station applies a third one-way transformation to said authentication application information and said secret information unique to itself to generate first common-key information independent of said public information, and generates a second variable parameter and applies a fourth one-way transformation to said second variable parameter and said first common-key information to generate authentication challenge information dependent on said first and second variable parameters, and transmits said authentic challenge information to said prover station;

wherein said prover station applies a fifth one-way transformation to the received said authentication challenge information, said first variable parameter and said secret information unique to the prover to be authenticated to generate authentication response information independent of said first variable parameter, and applies a sixth one-way transformation to said first variable parameter to generate second common-key information, and encrypts prescribed information, using said second common-key information, and transmits the encrypted said prescribed information to said second authenticating station together with said authentication response information and said identification information of the prover, wherein said second authenticating station decrypts, using said first common-key information, the encrypted said prescribed information and applies a seventh one-way transformation to the received said authentication response information and said second variable parameter to generate authentication reference information independent of said second variable parameter and transmits said authentication reference information to said first authenticating station together with the decrypted said identification information of said prover;

wherein said first authenticating station retrieves said transformed secret information, corresponding to the received said identification information, from said data base, checks if the retrieved said transformed secret information matches with the received said authentication reference information, and when they match, transmits approval information, indicating that said prover is a correct prover, to said second authenticating station, and when they do not match, transmits disapproval information indicating that said prover is not authenticated as a correct prover; and wherein said second authenticating station authenticates said prover according to the received said approval or disapproval information.

43. The personal authentication method according to claim 42, wherein said prover station encrypts order information of goods as said prescribed information, using said second common-key information, and transmits said order information of goods to said second authenticating station together with said authentication response information and said identification information of said prover.

44. A method in which first and second authenticating stations cooperatively authenticate information related to a prover transmitted from a prover station, said method comprising:

said first authenticating station storing, in a data base, a pair of identification information of said prover and transformed secret information, wherein said transformed secret information is obtained by applying a first one-way transformation to secret information corresponding to said identification information;

wherein when said prover station requests an authentication application, said second authenticating station generates a first variable parameter, applies a second one-way transformation to said first variable parameter to generate authentication challenge information dependent on said first variable parameter, and transmits said authentication challenge information to said prover station;

wherein upon receiving said authentication challenge information, said prover station generates a second variable parameter and applies a third one-way transformation to said second variable parameter, said authentication challenge information and said secret information unique to said prover to be authenticated to generate first authentication response information dependent on said secret information and said first and second variable parameters, and applies a fourth one-way transformation to said second variable parameter and public information about the second authenticating station to generate second authentication response information dependent on said second variable parameter and said public information, applies a fifth one-way transformation to said second variable parameter to generate first common-key information, and encrypts said identification information of said prover, using said first common-key information, and transmits the encrypted said identification information to said second authenticating station together with said first and second authentication response information, wherein said second authenticating station applies a sixth one-way transformation to the received said second authentication response information and said secret information unique to itself to generate second common-key information independent of said public information, decrypts, using said second common-key information, the encrypted said identification information of said prover, applies a seventh one-way transformation to said second common-key information, said first variable parameter and the received said first authentication response information to generate authentication reference information independent of said first and second variable parameters, and transmits said authentication reference information to said first authenticating station together with the decrypted said identification information of said prover, wherein said first authenticating station retrieves said transformed secret information, corresponding to the received said identification information of the prover, from said data base, checks if the retrieved said transformed secret information matches with the received said authentication reference information and transmits, to said second authenticating station, approval information indicating that said prover is a correct prover when they match, and transmits disapproval information indicating that said prover is not a correct prover when they do not match; and wherein said second authenticating station authenticates said prover according to the received said approval or disapproval information.

45. The personal authentication method according to claim 44, wherein said first and second variable parameters are random-number parameters.

46. The personal authentication method according to claim 44 or 45, wherein if said secret information corresponding to the identification information of said prover is a positive integer $s_i$, p is a prime number, and g is an integer value which satisfies an inequality 1<g<p;

said transformed secret information is a remainder value obtained when $g^{s_i}$ is divided by the prime number p.

47. The personal authentication method according to claim 46, wherein said integer value g is varied for each prover.

48. The personal authentication method according to claim 44 or 45, wherein if said secret information corresponding to said identification information of said prover is a positive integer $s_i$, p is a prime number, g is an integer value which satisfies an inequality 1<g<p, and h is a hash function;

said transformed secret information is a remainder value from a division of $g^{h(s_i)}$ by the prime number p.

49. The personal authentication method according to claim 48, wherein if said first variable parameter r is an integer value which satisfies:

$0<r<p-1$ $\gcd(r, p-1)=1$ where gcd ($\alpha$, $\beta$) indicates the greatest common divisor of $\alpha$ and $\beta$;

said second variable parameter x is an integer value which satisfies:

$0<x<p-1$ $\gcd(x, p-1)=1$ said secret information $S_a$ unique to said second authenticating station is an integer value which satisfies:

$0<S_a<p-1$ $\gcd(S_a, p-1)=1$, u is an integer value ($0<u<p-1$) which satisfies:

$uS_a \mod p-1=1$;

said public information $P_a$ about said second authenticating station is a value represented by:

$P_a = g^u \mod p$ where $\alpha \mod \beta$ indicates a remainder value from division of $\alpha$ by $\beta$;

said second authentication response information C is a value calculated as:

$C = P_a^x \mod p = g^{ux} \mod p$;

said first common-key information $C_1$ is a value calculated as:

$C_1 = g^x \mod p$;

said second common-key information $C_0$ is a value calculated as:

$C_0 = C^{sa} \mod p = g^x \mod p$;

z is a value calculated as:

$z = C_0^{-1} \mod p$;

w is a value calculated as:

$w = z^r \mod p = g^{-xr} \mod p$; and s is an integer value ($0<s<p-1$) which satisfies:

$rs \mod p-1=1$; and said authentication challenge information Cha, said first authentication response information Resp and said authentication reference information Aut are obtained respectively by:

$Cha = g^r \mod p$ $Resp = g^{Cha+h(s_i)} \mod p = g^{r\{x+h(s_i)\}} \mod p$ $Aut = (Resp \times w)^s \mod p = g^{h(s_i)} \mod p$.

50. The personal authentication method according to claim 49, wherein said integer value g is varied for each prover.

51. The personal authentication method according to claim 49, wherein said hash function h is varied for each prover.

52. The personal authentication method according to claim 48, wherein said hash function h is varied for each prover.

53. The personal authentication method according to claim 48, wherein said integer value g is varied for each prover.

54. The personal authentication method according to claim 44, wherein said prover station encrypts, using said first common-key information, prescribed information in addition to said identification information of said prover and transmits said prescribed information to said second authenticating station together with said authentication response information.

55. The personal authentication method according to claim 54, wherein said prescribed information is order information of goods.

56. A method in which first and second authenticating stations cooperatively authenticate information related to a prover transmitted from a prover station, said method comprising:

said first authenticating station storing, in a data base, a pair of identification information of said prover and transformed secret information, wherein said transformed secret information is obtained by applying a first one-way transformation to secret information corresponding to said identification information;

wherein when said prover station requests an authentication application, said second authenticating station generates a first variable parameter and applies a second one-way transformation to said first variable parameter to generate authentication challenge information dependent on said first variable parameter and transmits said authentication challenge information to said prover station;

wherein upon receiving said authentication challenge information, said prover station generates a second variable parameter and applies a third one-way transformation to said second variable parameter, said authentication challenge information and said secret information unique to the prover to be authenticated to generate first authentication response information dependent on said secret information and said first and second variable parameters, and applies a fourth one-way transformation to said second variable parameter and public information about the second authenticating station to generate second authentication response information dependent on said second variable parameter and said public information, applies a fifth one-way transformation to said second variable parameter to generate first common-key information, and encrypts prescribed information, using said first common-key information, and transmits the encrypted said prescribed information to said second authenticating station together with said first and second authentication response information and said identification information of the prover;

wherein said second authenticating station applies a sixth one-way transformation to the received said second authentication response information and said secret information unique to itself to generate second common-key information independent of said public information, decrypts, using said second common-key information, the encrypted said prescribed information, applies a seventh one-way transformation to said second common-key information, said first variable parameter and the received said first authentication response information to generate authentication reference information independent of said first and second variable parameters, and transmits said authentication reference information to said first authenticating station together with the received said identification information of said prover, wherein said first authenticating station retrieves said transformed secret information, corresponding to the received identification information of said prover, from said data base, checks if the retrieved said transformed secret information matches with the received said authentication reference information and transmits, to said second authenticating station, approval information indicating that said prover is a correct prover when they match, and disapproval information indicating that said prover is not a correct prover when they do not match; and wherein said second authenticating station authenticates said prover according to the received said approval or disapproval information.

57. The personal authentication method according to claim 56, wherein said prover station encrypts order information of goods as said prescribed information, using said first common-key information, and transmits said order information of goods to said second authenticating station together with said first and second authentication response information and said identification information of said prover.

58. A method in which first and second authenticating stations and a prover station communicate so as to authenticate identities of provers, wherein the first authenticating station has a data base which contains identification information and corresponding transformed secret information about a prover, said method comprising:

transmitting a request from the prover station to the second authenticating station for authentication application processing, generating, at the second authenticating station, a variable parameter and calculating authentication challenge information using the variable parameter, obtaining, at the prover station, secret information and the identification information from the prover, transmitting the authentication challenge information from the second authenticating station to the prover station, wherein the prover station calculates authentication response information by using the authentication challenge information and the secret information, transmitting the authentication response information and identification information from the prover station to the second authenticating station, wherein the second authenticating station calculates authentication reference information by using the authentication response information, transmitting the authentication reference information and identification information from the second authenticating station to the first authenticating station, retrieving the transformed secret information, corresponding to the identification information obtained from the prover, from the data base of the first authenticating station, and comparing the retrieved transformed secret information with the authentication reference information, and if they match, transmitting approval information to the second authenticating station, and if they do not match, transmitting disapproval information to the second authenticating station, and authenticating, at the second authenticating station, the identity of the prover according to the approval or disapproval information received from the first authenticating station.

59. The method according to claim 58, wherein the variable parameter is a random number.

60. The method according to claim 58 or 59, wherein the transformed secret information is a remainder value obtained when $g^{si}$ is divided by the prime number p, wherein the secret information corresponding to the identification information of the prover is a positive integer si, p is a prime number, and g is an integer value which satisfies the inequality $1<g<p$.

61. The method according to claim 60, wherein the integer value g is different for different provers.

62. The method according to claim 58 or 59, wherein the transformed secret information is a remainder value obtained when $g^{h(si)}$ is divided by the prime number p, wherein the secret information corresponding to the identification information of the prover is a positive integer si, p is a prime number, and g is an integer value which satisfies the inequality $1<g<p$, and h is a hash function.

63. The method according to claim 62, wherein the hash function h is different for different provers.

* * * * *